US008933364B2

(12) United States Patent
Hussary et al.

(10) Patent No.: US 8,933,364 B2
(45) Date of Patent: Jan. 13, 2015

(54) HIGH CURRENT ELECTRODE FOR A PLASMA ARC TORCH

(71) Applicant: Thermal Dynamics Corporation, West Lebanon, NH (US)

(72) Inventors: Nakhleh Hussary, Grantham, NH (US); Christopher J. Conway, Wilmot, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 14/174,541

(22) Filed: Feb. 6, 2014

(65) Prior Publication Data

US 2014/0183170 A1 Jul. 3, 2014

Related U.S. Application Data

(63) Continuation of application No. 13/407,256, filed on Feb. 28, 2012, now Pat. No. 8,680,426.

(60) Provisional application No. 61/447,560, filed on Feb. 28, 2011.

(51) Int. Cl.
*B23K 10/00* (2006.01)
*H05H 1/34* (2006.01)
*H05H 1/28* (2006.01)

(52) U.S. Cl.
CPC . *H05H 1/34* (2013.01); *H05H 1/28* (2013.01); *H05H 2001/3442* (2013.01)
USPC ... 219/121.52; 219/119; 219/75; 219/121.48; 315/111.21

(58) Field of Classification Search
CPC ............. H05H 1/34; H05H 1/26; H05H 1/32; H05J 37/32532; H05J 37/32541; B23K 10/00; B23K 9/00
USPC ......... 219/121.52, 121.48, 121.39, 75, 121.5, 219/119; 315/111.21
See application file for complete search history.

(56) References Cited

U.S. PATENT DOCUMENTS 3,198,932 A * 8/1965 Weatherly ................ 219/146.21
4,810,851 A * 3/1989 Fridlyand ................ 219/121.59
5,083,005 A * 1/1992 Degrigny ................. 219/121.52
5,126,528 A * 6/1992 Bush et al. .................... 219/119
5,601,734 A * 2/1997 Luo et al. ................. 219/121.52
6,066,827 A * 5/2000 Nemchinsky ............ 219/121.52
7,659,488 B2 * 2/2010 Cook et al. ............... 219/121.52
8,362,387 B2 * 1/2013 Wilson ....................... 219/121.5
2008/0272094 A9 * 11/2008 Mather et al. ............ 219/121.52

* cited by examiner

*Primary Examiner* — Mark Paschall
(74) *Attorney, Agent, or Firm* — Brinks Gilson & Lione

(57) ABSTRACT

An electrode for a plasma arc torch includes a conductive body and a plurality of emissive inserts. The conductive body includes a proximal end portion, a distal end portion and a cavity extending from the proximal end portion to the distal end portion. The distal end portion defines a distal end face. The plurality of emissive inserts extend through the distal end face. The conductive body further defines a dimple extending into the distal end face and at least partially into the emissive inserts. The dimple is positioned concentrically about a centerline of the conductive body.

20 Claims, 23 Drawing Sheets

HIGH CURRENT ELECTRODE FOR A PLASMA ARC TORCH

CROSS-REFERENCE TO RELATED APPLICATIONS

The present application is a continuation application of U.S. application Ser. No. 13/407,256, filed on Feb. 28, 2012 and titled "HIGH CURRENT ELECTRODE FOR A PLASMA ARC TORCH," which claims priority to U.S. Provisional Application Ser. No. 61/447,560, filed Feb. 28, 2011, entitled "PLASMA ARC TORCH HAVING IMPROVED CONSUMABLES LIFE." The disclosure of the above applications is incorporated herein by reference in its entirety.

FIELD

The present disclosure relates to plasma arc torches and more specifically to electrodes for use in plasma arc torches and manufacturing methods thereof.

BACKGROUND

The statements in this section merely provide background information related to the present disclosure and may not constitute prior art.

Plasma arc torches, also known as electric arc torches, are commonly used for cutting, marking, gouging, and welding metal workpieces by directing a high energy plasma stream consisting of ionized gas particles toward the workpiece. In a typical plasma arc torch, the gas to be ionized is supplied to a distal end of the torch and flows past an electrode before exiting through an orifice in the tip, or nozzle, of the plasma arc torch. The electrode has a relatively negative potential and operates as a cathode. Conversely, the torch tip constitutes a relatively positive potential and operates as an anode during piloting. Further, the electrode is in a spaced relationship with the tip, thereby creating a gap, at the distal end of the torch. In operation, a pilot arc is created in the gap between the electrode and the tip, often referred to as the plasma arc chamber, wherein the pilot arc heats and ionizes the gas. The ionized gas is blown out of the torch and appears as a plasma stream that extends distally off the tip. As the distal end of the torch is moved to a position close to the workpiece, the arc jumps or transfers from the torch tip to the workpiece with the aid of a switching circuit activated by the power supply. Accordingly, the workpiece serves as the anode, and the plasma arc torch is operated in a "transferred arc" mode.

The consumables of the plasma arc torch, such as the electrode and the tip, are susceptible to wear due to high current/power and high operating temperatures. After the pilot arc is initiated and the plasma stream is generated, the electrode and the tip are subjected to high heat and wear from the plasma stream throughout the entire operation of the plasma arc torch. Improved consumables and methods of operating a plasma arc torch to increase consumables life, thus increasing operating times and reducing costs, are continually desired in the art of plasma cutting.

SUMMARY

An electrode for use in a plasma arc torch includes a conductive body and a plurality of emissive inserts. The conductive body includes a proximal end portion, a distal end portion and a cavity extending from the proximal end portion to the distal end portion. The distal end portion defines a distal end face. The plurality of emissive inserts extend through the distal end face. The conductive body defines a dimple extending into the distal end face and at least partially into the emissive inserts. The dimple is positioned concentrically about a centerline of the conductive body.

In still another form, an electrode for use in a plasma arc torch includes a conductive body and a plurality of emissive inserts. The conductive body includes a proximal end portion, a distal end portion and a cavity extending from the proximal end portion to the distal end portion. The distal end portion defines a distal end face. The plurality of emissive inserts extend through the distal end face. The conductive body defines a dimple at a center of the distal end face and extending into the distal end face and only partially into the emissive inserts.

In yet another form, an electrode for use in a plasma arc torch includes a conductive body, a central protrusion and a plurality of emissive inserts. The conductive body includes a proximal end portion, a distal end portion and a cavity extending from the proximal end portion to the distal end portion. The distal end portion defines a distal end face. The central protrusion extends from the distal end face into the cavity. The plurality of emissive inserts extend through the distal end face. The conductive body defines a dimple at a center of the distal end face and recessed from the distal end face. The plurality of emissive inserts are arranged along an outer periphery of the dimple and overlap the dimple.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
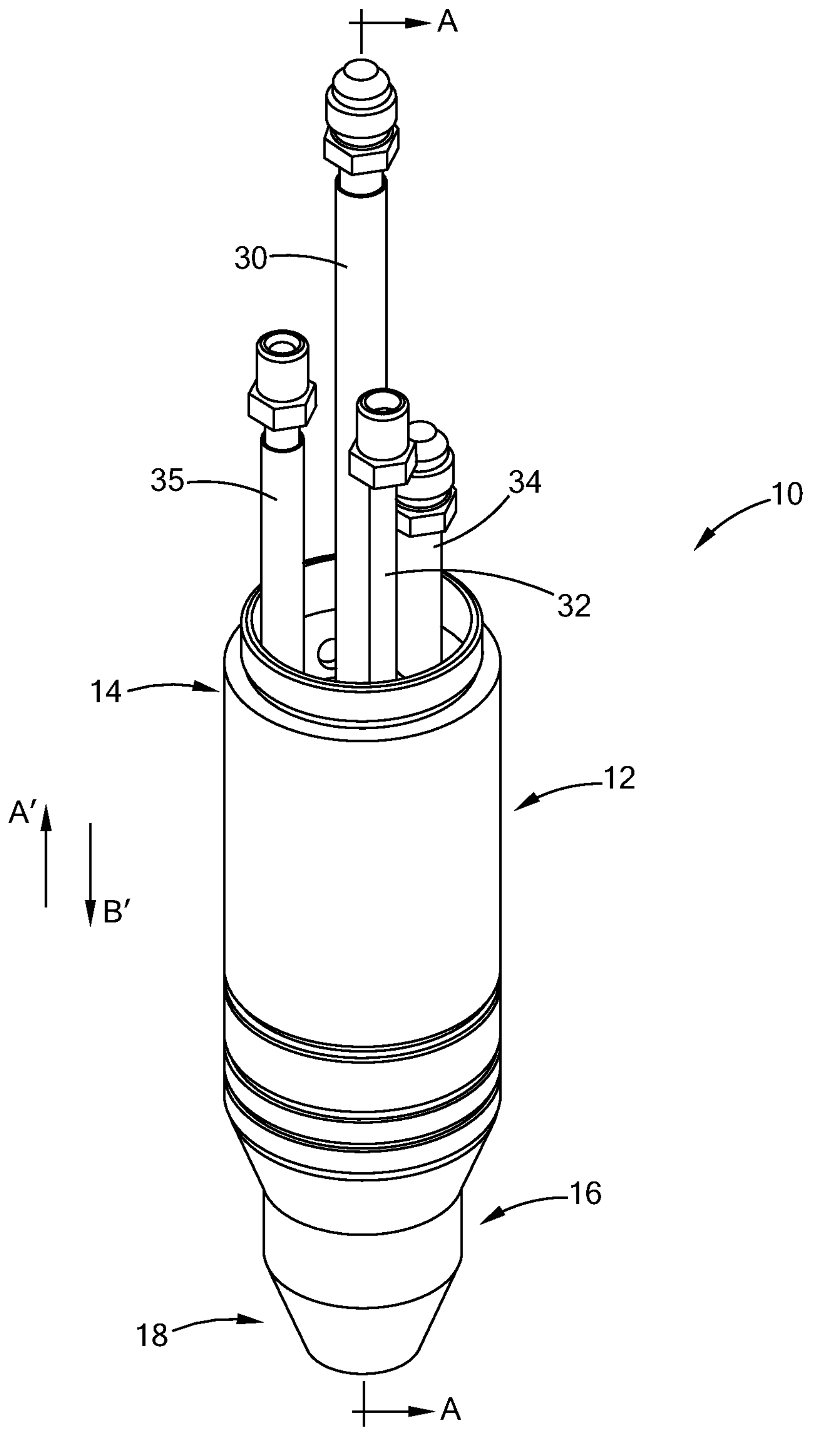
FIG. 1 is a perspective view of a plasma arc torch constructed in accordance with the principles of the present disclosure.

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 2:
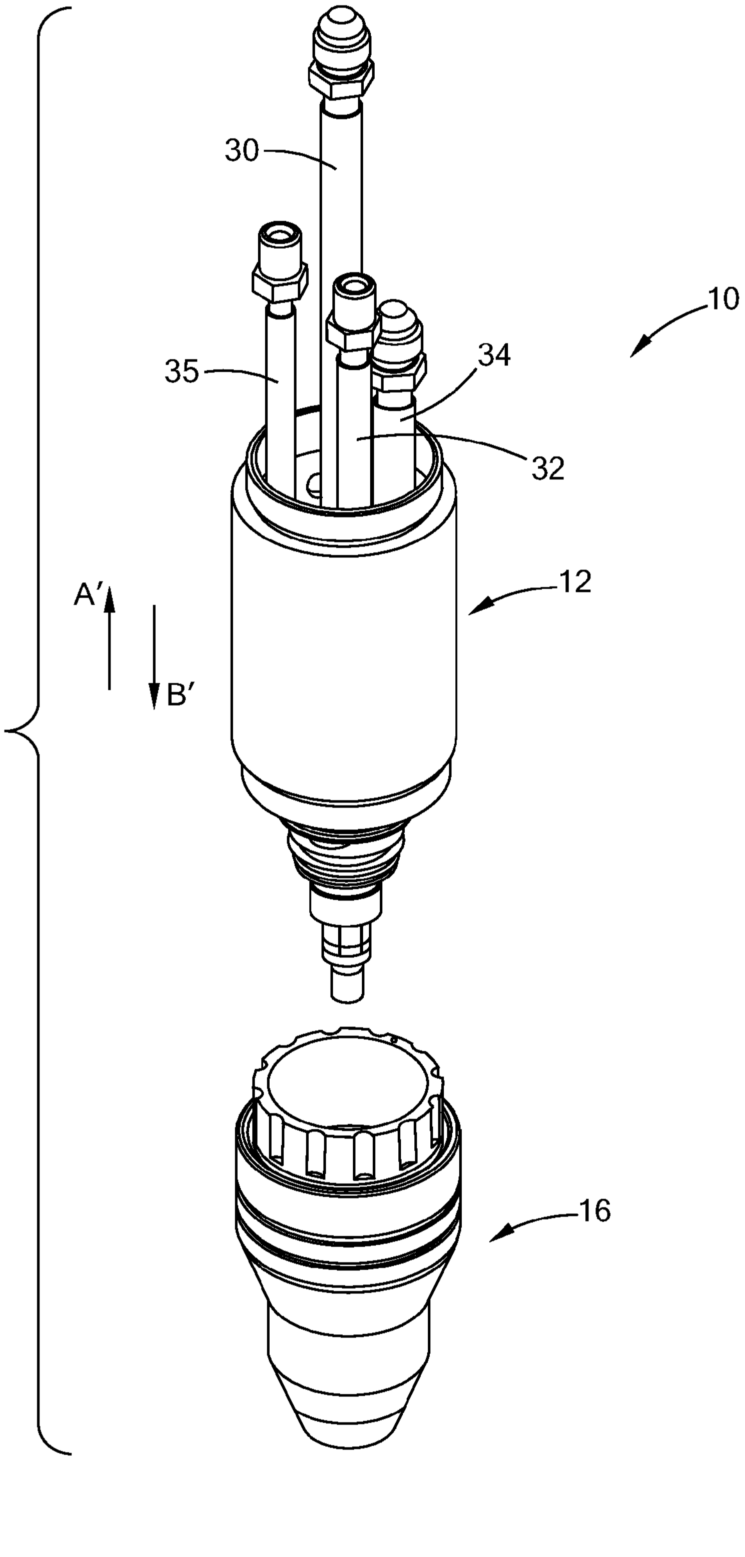
FIG. 2 is an exploded perspective view of a plasma arc torch constructed in accordance with the principles of the present disclosure.
Figure 3:
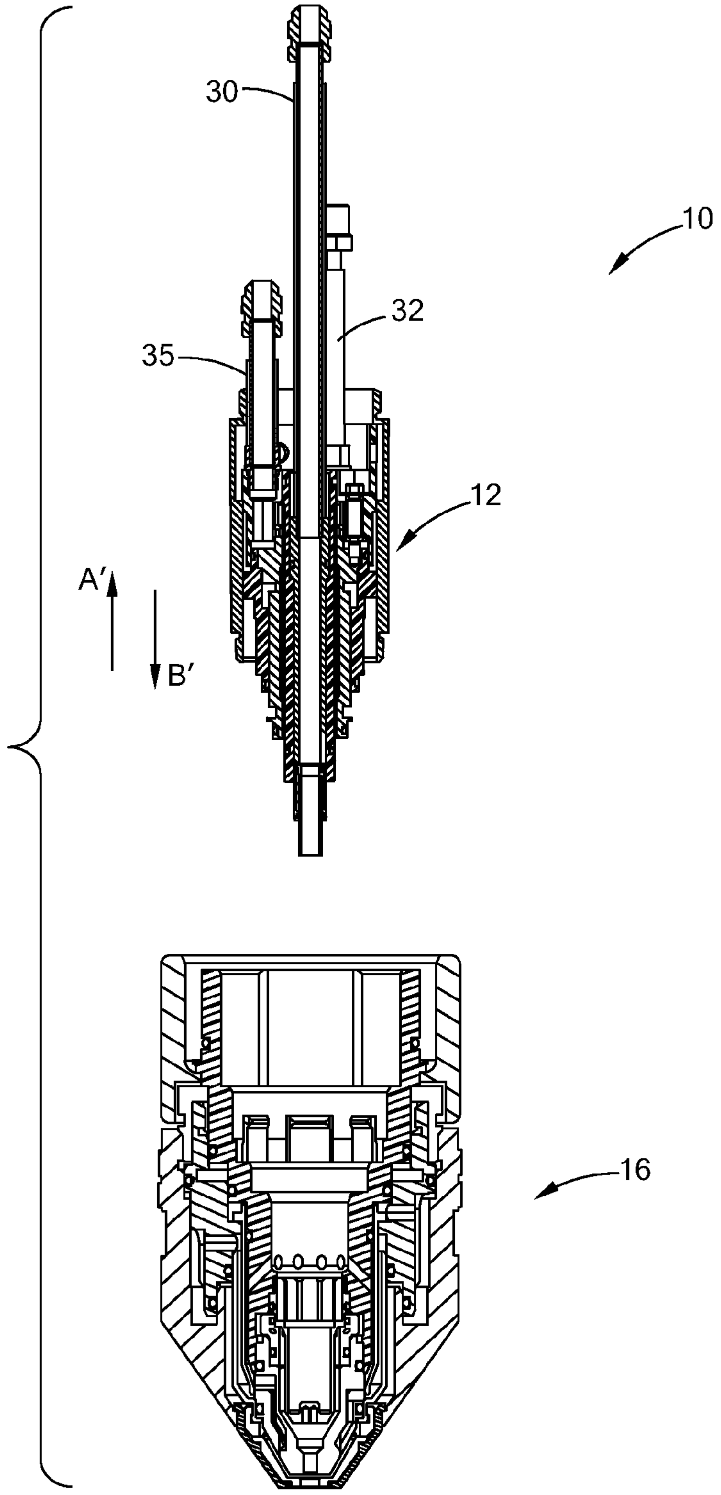
FIG. 3 is an exploded, cross-sectional view of a plasma arc torch, taken along line A-A of FIG. 1 and constructed in accordance with the principles of the present disclosure.

Referring to the drawings, a plasma arc torch according to the present disclosure is illustrated and indicated by reference numeral 10 in FIG. 1 through FIG. 3. The plasma arc torch 10 generally comprises a torch head 12 disposed at a proximal end 14 of the plasma arc torch 10 and a consumables cartridge 16 secured to the torch head 12 and disposed at a distal end 18 of the plasma arc torch 10 as shown.

As used herein, a plasma arc torch should be construed by those skilled in the art to be an apparatus that generates or uses plasma for cutting, welding, spraying, gouging, or marking operations, among others, whether manual or automated. Accordingly, the specific reference to plasma arc cutting torches or plasma arc torches should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention. Additionally, proximal direction or proximally is the direction towards the torch head 12 from the consumable cartridge 16 as depicted by arrow A', and distal direction or distally is the direction towards the consumable components 16 from the torch head 12 as depicted by arrow B'.

Figure 4:
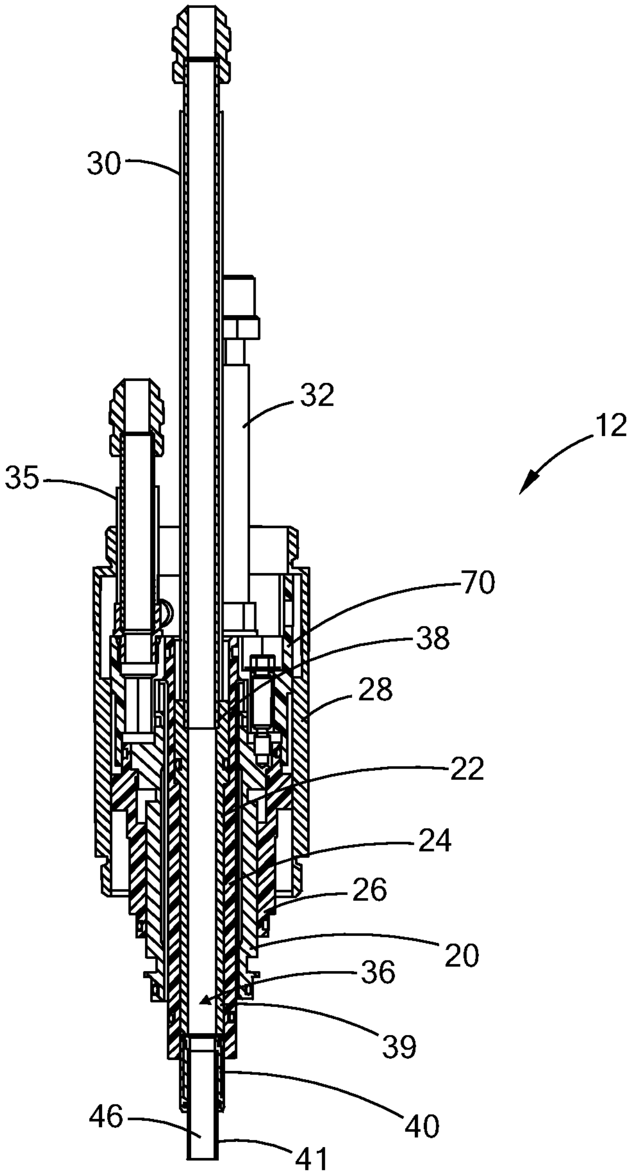
FIG. 4 is a cross-sectional view of a torch head of the plasma arc torch of FIG. 3.

Referring more specifically to FIG. 4, the torch head 12 includes an anode body 20, a cathode 22, a central insulator 24 that insulates the cathode 22 from the anode body 20, an outer insulator 26, and a housing 28. The outer insulator 26 surrounds the anode body 20 and insulates the anode body 20 from the housing 28. The housing 28 encapsulates and protects the torch head 12 and its components from the surrounding environment during operation. The torch head 12 is further adjoined with a coolant supply tube 30, a plasma gas tube 32, a coolant return tube 34 (shown in FIGS. 1 and 2), and a secondary gas tube 35, wherein plasma gas and secondary gas are supplied to and cooling fluid is supplied to and returned from the plasma arc torch 10 during operation as described in greater detail below.

The central insulator 24 defines a cylindrical tube that houses the cathode 22 as shown. The central insulator 24 is further disposed within the anode body 20 and also engages a torch cap 70 that accommodates the coolant supply tube 30, the plasma gas tube 32, and the coolant return tube 34. The anode body 20 is in electrical communication with the positive side of a power supply (not shown) and the cathode 22 is in electrical communication with the negative side of the power supply. The cathode 22 defines a cylindrical tube having a proximal end 38, a distal end 39, and a central bore 36 extending between the proximal end 38 and the distal end 39. The bore 36 is in fluid communication with the coolant supply tube 30 at the proximal end 38 and a coolant tube assembly 41 at the distal end 39. The cooling fluid flows from the coolant supply tube 30 to the central bore 36 of the cathode 22 and is then distributed through a central bore 46 of the coolant tube assembly 41 to the consumable components of the consumable cartridge 16. A cathode cap 40 is attached to the distal end 39 of the cathode 22 to protect the cathode 22 from damage during replacement of the consumable components or other repairs. The torch head 12 of the plasma arc torch has been disclosed in U.S. Pat. No. 6,989,505, the contents of which are incorporated by reference in its entirety.

Figure 5:
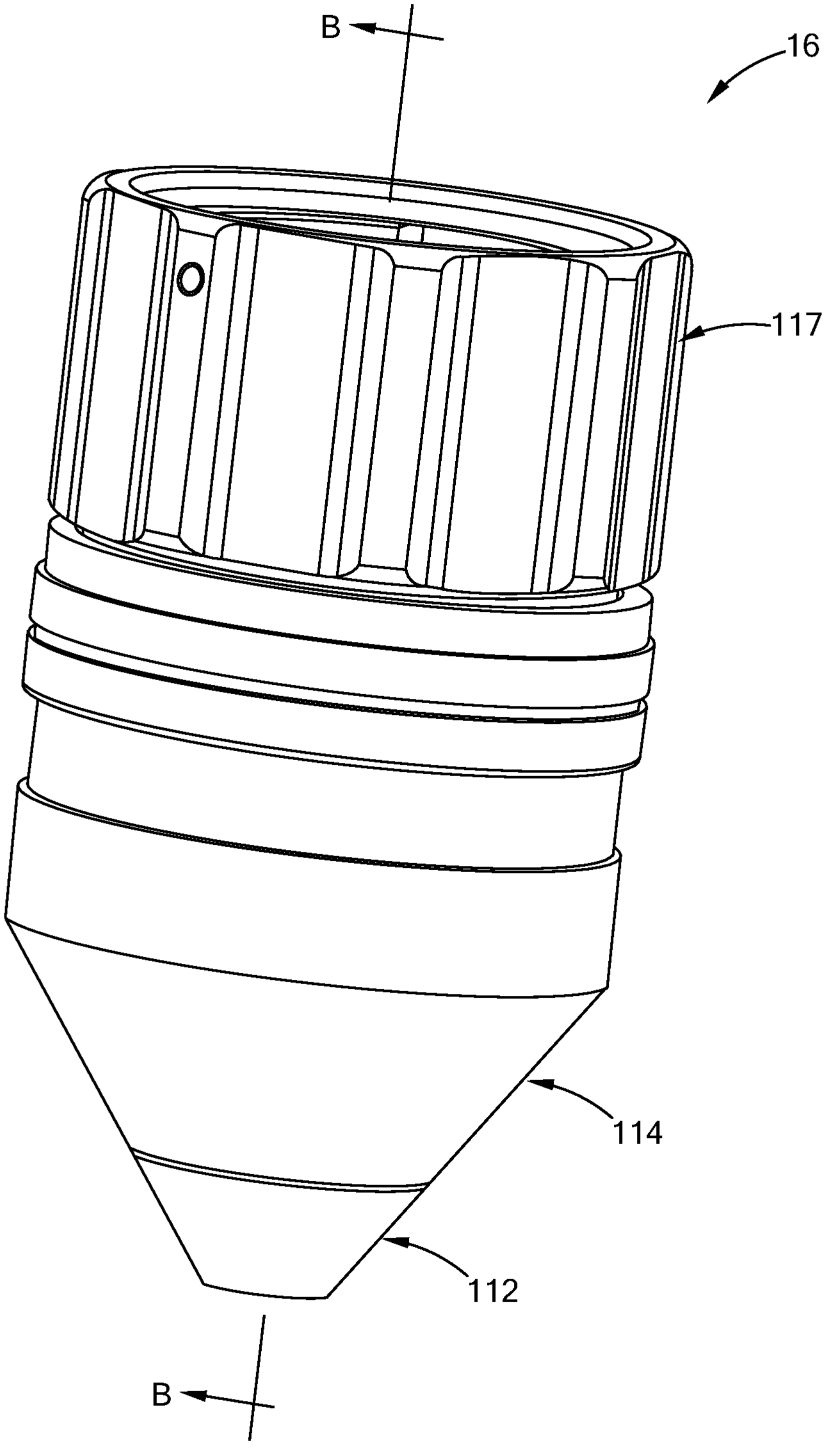
FIG. 5 is a perspective view of a consumable cartridge of a plasma arc torch constructed in accordance with the principles of the present disclosure.
Figure 6:
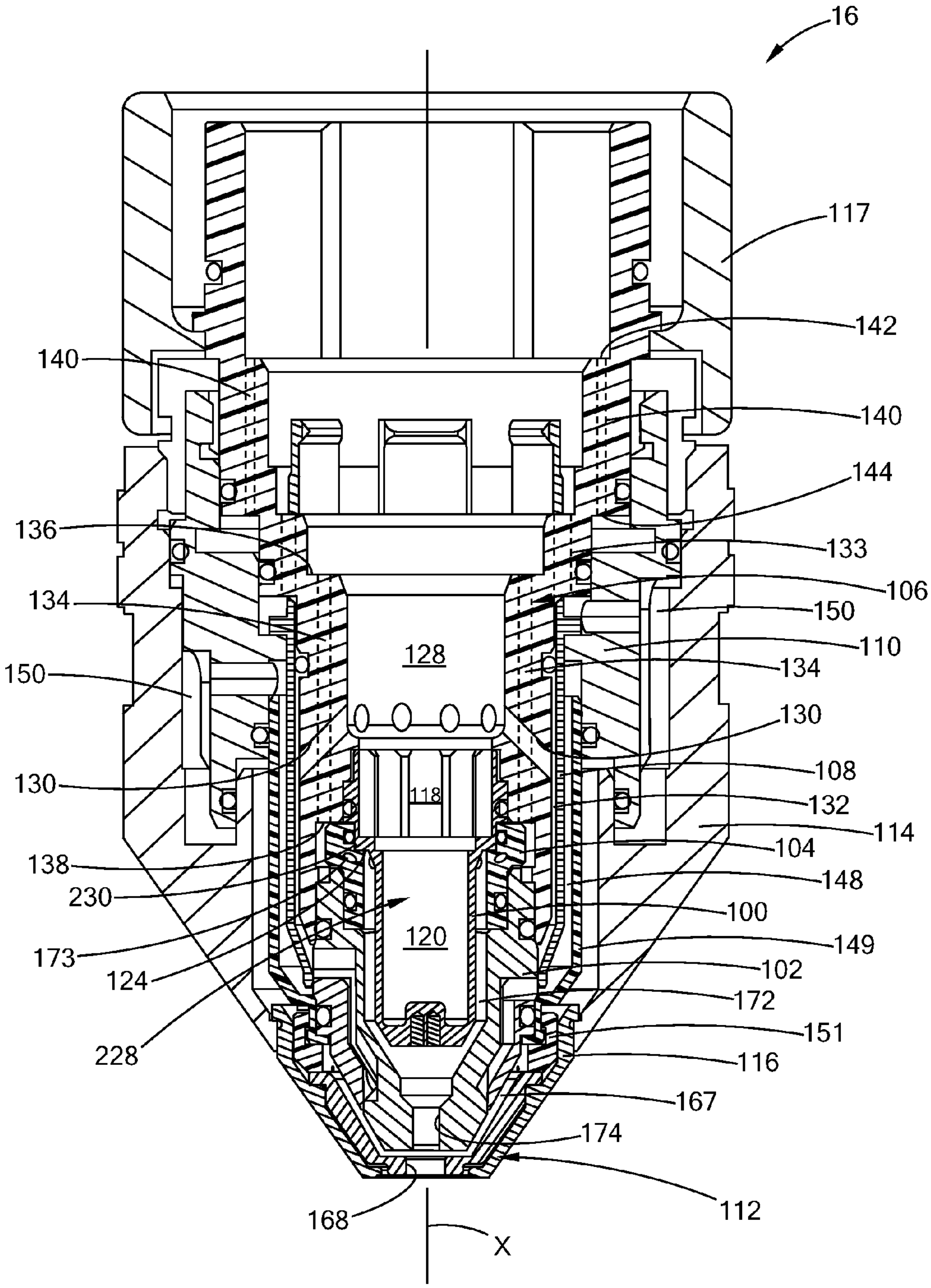
FIG. 6 is a cross-sectional view, taken along line B-B of FIG. 6, of the consumable cartridge in accordance with the principles of the present disclosure.

Referring to FIGS. 5 and 6, the consumable cartridge 16 includes a plurality of consumables including an electrode 100, a tip 102, a spacer 104 disposed between the electrode 100 and the tip 102, a cartridge body 106, an anode member 108, a baffle 110, a secondary cap 112, and a shield cap 114. The cartridge body 106 generally houses and positions the other consumable components 16 and also distributes plasma gas, secondary gas, and cooling fluid during operation of the plasma arc torch 10. The cartridge body 106 is made of an insulative material and separates anodic member (e.g., the anode member 108) from cathodic members (e.g., electrode 100). The baffle 110 is disposed between the cartridge body 106 and the shield cap 114 for directing cooling fluid.

The anode member 108 connects the anode body 20 (shown in FIG. 4) in the torch head 20 to the tip 102 to provide electrical continuity from the power supply (not shown) to the tip 102. The anode member 108 is secured to the cartridge body 106. The spacer 104 provides electrical separation between the cathodic electrode 100 and the anodic tip 102, and further provides certain gas distributing functions. The shield cap 114 surrounds the baffle 110 as shown, wherein a secondary gas passage 150 is formed therebetween. The secondary cap 112 and the tip 102 define a secondary gas chamber 167 therebetween. The secondary gas chamber 167 allows a secondary gas to flow through to cool the tip 102 during operation.

As further shown, the consumable cartridge 16 further includes a locking ring 117 to secure the consumable cartridge 16 to the torch head 12 (shown in FIG. 4) when the plasma arc torch 10 is fully assembled. The consumable cartridge 16 further include a secondary spacer 116 that separates the secondary cap 112 from the tip 102 and a retaining cap 149 that surrounds the anode member 108. The secondary cap 112 and the secondary spacer 116 are secured to a distal end 151 of the retaining cap 149.

The tip 102 is electrically separated from the electrode 100 by the spacer 104, which results in a plasma chamber 172 being formed between the electrode 100 and the tip 102. The tip 102 further comprises a central orifice (or an exit orifice) 174, through which a plasma stream exits during operation of the plasma arc torch 10 as the plasma gas is ionized within the plasma chamber 172. The plasma gas enters the tip 102 through the gas passageway 173 of the spacer 104.

Referring to FIGS. 7 to 10, the electrode 100 includes a conductive body 220 and a plurality of emissive inserts 222. The conductive body 200 includes a proximal end portion 224 and a distal end portion 226 and defines a central cavity 228 extending through the proximal end portion 224 and in fluid communication with the coolant tube assembly 41 (shown in FIGS. 4 and 18). The central cavity 228 includes a distal cavity 120 and a proximal cavity 118.

The proximal end portion 224 includes an external shoulder 230 that abuts against the spacer 104 for proper positioning along the central longitudinal axis X of the plasma arc torch 10. The spacer 104 includes an internal annular ring 124 (shown in FIG. 6) that abuts the external shoulder 230 of the electrode 100 for proper positioning of the electrode 100 along the central longitudinal axis X of the plasma arc torch 10.

The electrode 100 further includes a central protrusion 232 in the distal end portion 226 and a recessed portion 235 surrounding the central protrusion 232 to define a cup-shaped configuration. The central protrusion 232 extends from a distal end face 234 into the central cavity 228. When the consumable cartridge 16 is mounted to the torch head 12, the central protrusion 232 is received within the central bore 46 of the coolant tube assembly 41 (shown in FIGS. 4 and 18) so that the cooling fluid from the central bore 36 of the cathode 32 is directed to the coolant tube assembly 41 and enters the central cavity 228 of the electrode 100. The central cavity 228 of the electrode 100 is thus exposed to a cooling fluid during operation of the plasma arc torch 10. The central protrusion 232 can be efficiently cooled because it is surrounded by the cooling fluid in the central cavity 228 of the electrode 100.

The distal end portion 226 further includes the distal end face 234 and an angled sidewall 236 extending from the distal end face 234 to a cylindrical sidewall 238 of the conductive body 220. The plurality of emissive inserts 222 are disposed at the distal end portion 226 and extend through the distal end face 234 into the central protrusion 232 and not into the central cavity 228. Parts of the emissive inserts 22 are surrounded by the cooling fluid in the central cavity 228 of the electrode 100, resulting in more efficient cooling of the emissive inserts 222. The plurality of emissive inserts 222 are concentrically nested about the centerline of the conductive body 220. The emissive inserts 222 each define a cylindrical configuration having a diameter of approximately 0.045 inches and include Hafnium. The emissive inserts 222 may have the same or different diameters. The conductive body 238 comprises a copper alloy. The emissive inserts 222 may be arranged to overlap or be spaced apart. When the emissive inserts 222 are spaced apart, the emissive inserts 222 are spaced as close as the manufacturing limitation allows. The space between the emissive inserts 222 may be less than about 0.010 inches, in one form of the present disclosure. When the emissive inserts 222 are arranged to overlap, the emissive inserts 222 may jointly form a number of configurations, including, by way of example, a cloverleaf shape as shown in FIG. 9.

In one form, the electrode 100 further includes a dimple 246 (shown in FIG. 10) extending into the distal end face 234 and at least partially into the emissive inserts 222, and positioned concentrically about a centerline of the conductive body 238 as shown. The dimple 246 extends into, for example, approximately 50% of an exposed area of the emissive inserts 222. While not shown in the drawings, it should be understood that more than one dimple may be provided while remaining within the scope of the present disclosure.

As further shown, a plurality of notches 240 are provided in one form of the present disclosure, which extend into the angled sidewall 236 and the distal end face 234 as shown. In one form, the notches 240 are evenly spaced around an interface 242 between the distal end face 234 and the angled sidewall 236. The notches 240 are provided to improve initiation of the pilot arc when starting the plasma arc torch 10.

Figure 7:
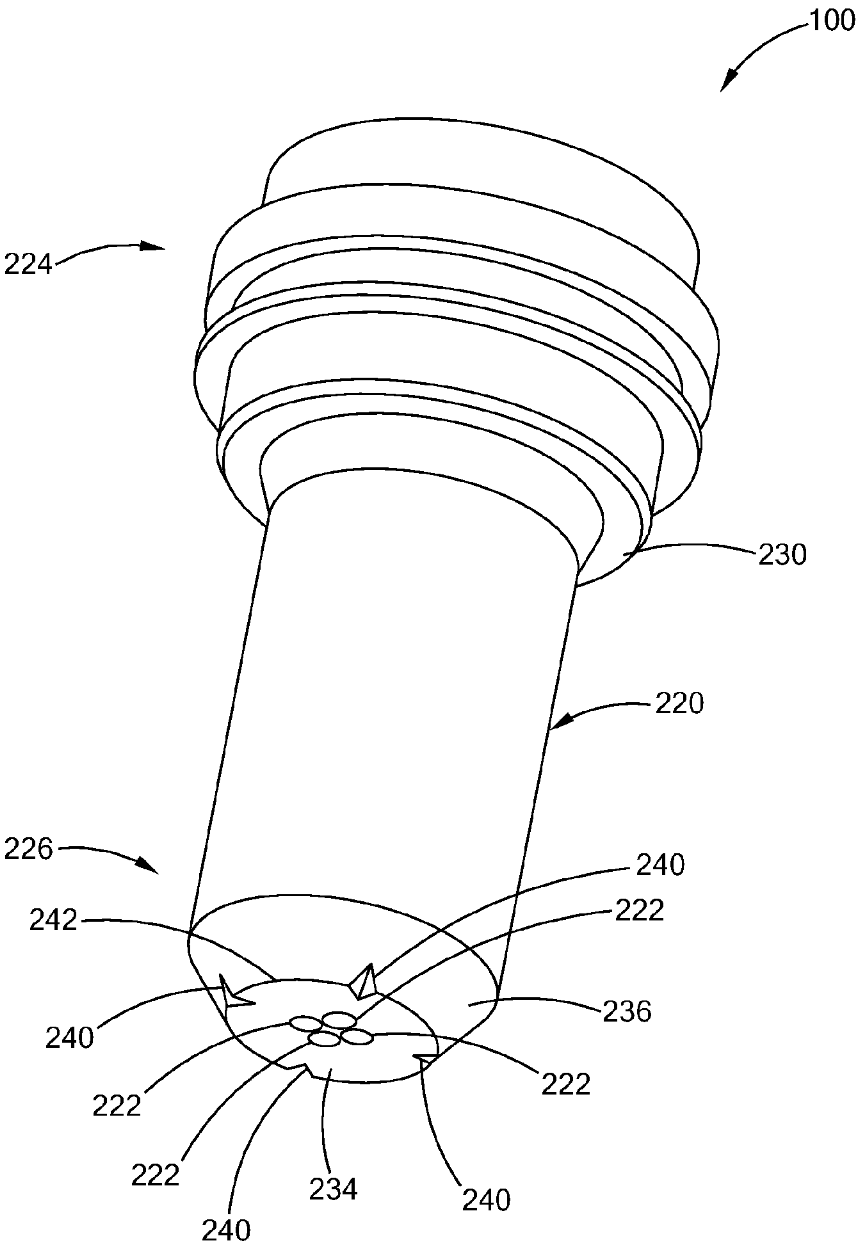
FIG. 7 is a perspective view of an electrode constructed in accordance with the principles of the present disclosure.
Figure 8:
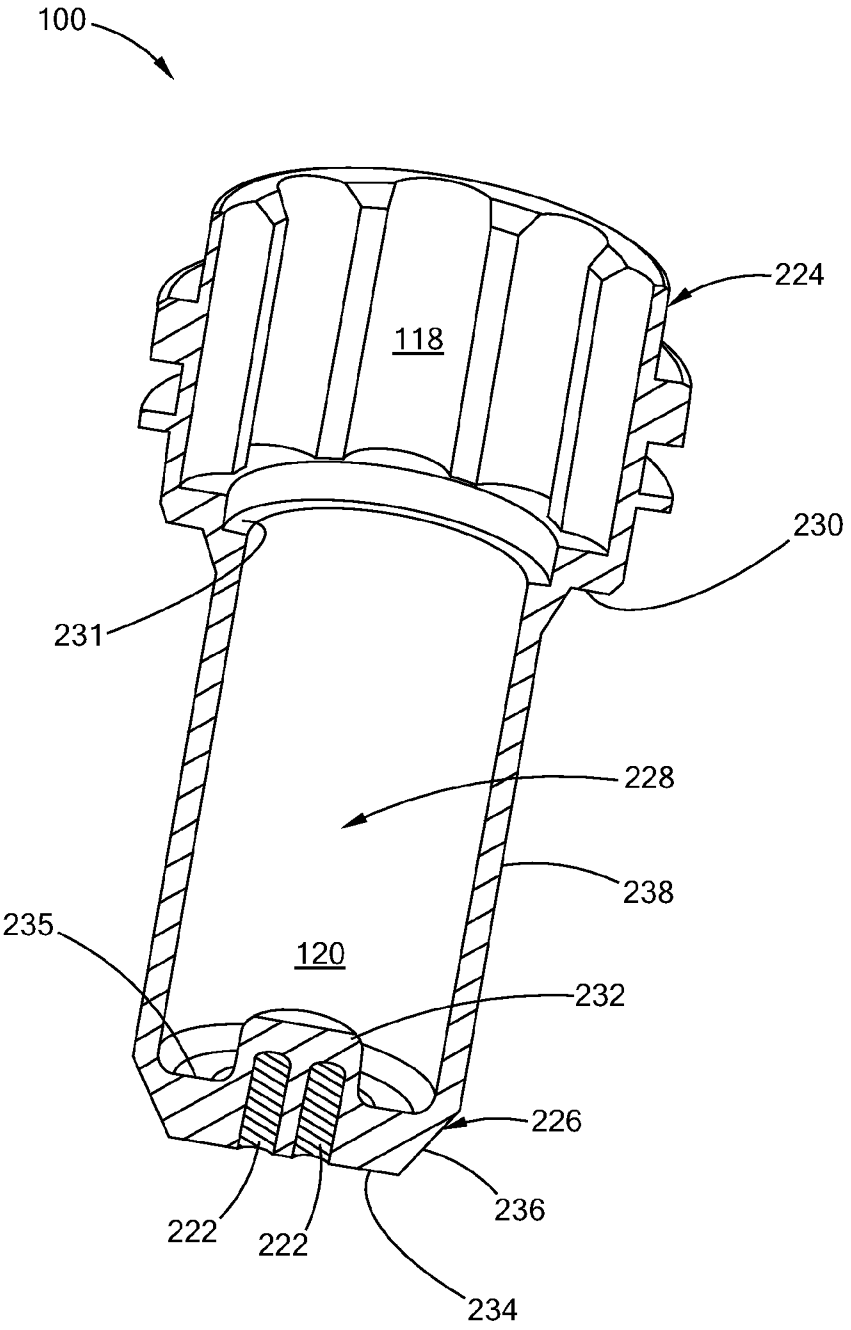
FIG. 8 is a perspective, cross-sectional view of an electrode constructed in accordance with the principles of the present disclosure.
Figure 9:
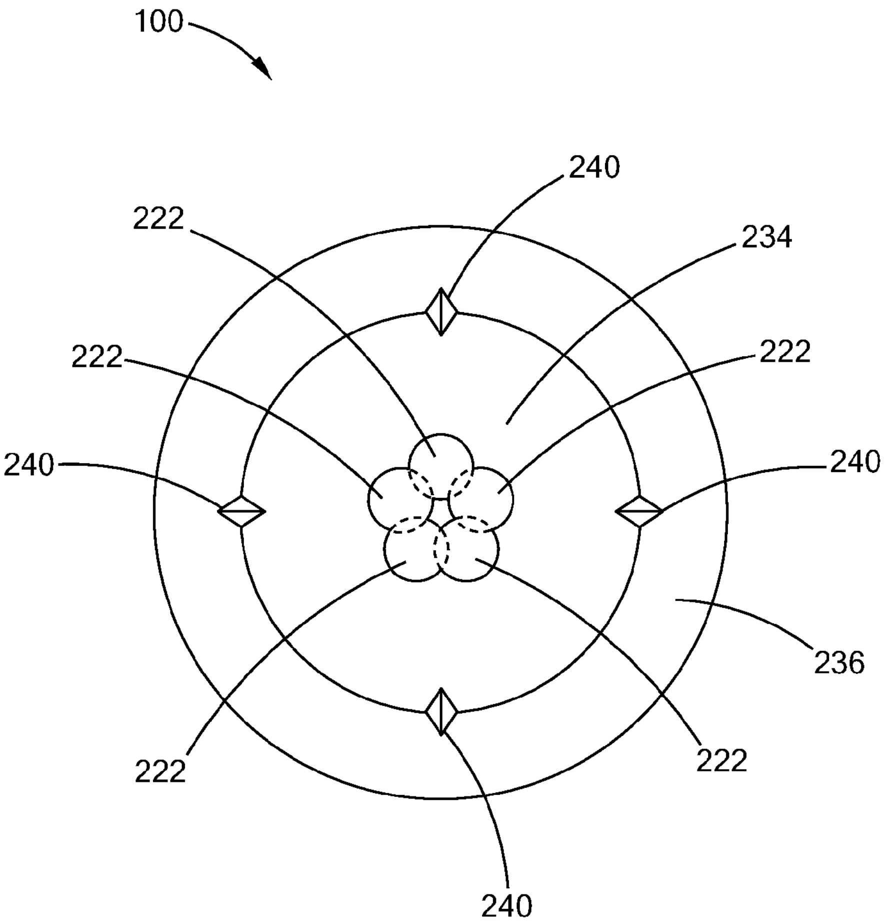
FIG. 9 is an end view of an electrode including overlapping emissive inserts and constructed in accordance with the principles of the present disclosure.
Figure 10:
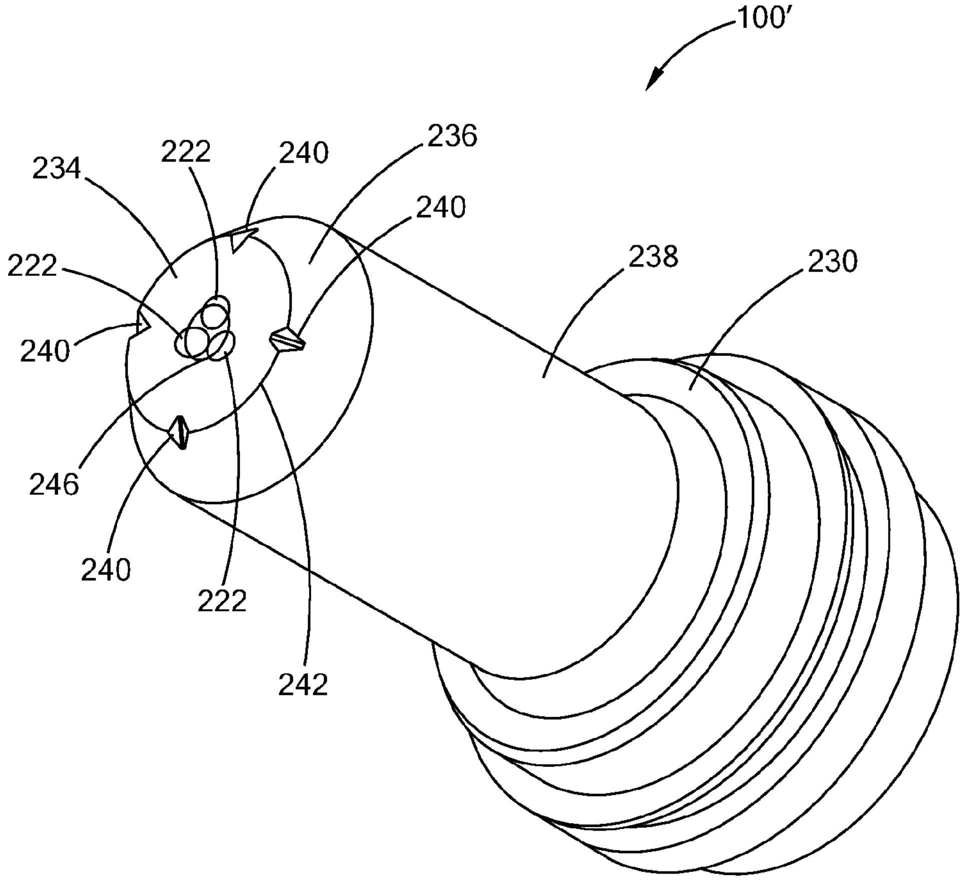
FIG. 10 is a perspective view of an alternate form of an electrode constructed in accordance with the principles of the present disclosure.

Referring to FIG. 10, the electrode 100' is different from the electrode 100 of FIGS. 7 and 9 in that the electrode 100' includes three emissive inserts 222 rather than four. The electrode 100' also includes the dimple 246 that is recessed from the distal end face 234, although it should be understood that the dimple 246 may or may not be provided in any of the electrode forms illustrated, described, and contemplated herein.

Referring to FIGS. 11A through 11D, the electrode may have any number of emissive inserts 222 without departing from the scope of the present disclosure. For example, the electrodes 100A, 110B, 100C, 100D may have any of three (3), four (4), six (6) and seven (7) emissive inserts 222. The emissive inserts 222 are arranged to define an encircling ring C which encircles the emissive inserts 222 therein. The encircling ring C may be less than, equal to, or greater than the diameter $D_1$ of the central orifice 174 of the tip 102 or the diameter $D_2$ of the tip counter sink (pre-orifice/orifice entrance) to the tip orifice as shown in FIG. 12. For example, the encircling ring C may be 50%, 100%, or 150% of the diameter of the central orifice 174 of the tip 102 or the diameter of the tip counter sink to the tip orifice. The diameter of the hafnium inserts 222 may be from approximately 0.030 inches to approximately 0.060 inches. Preferably, the diameter of the hafnium inserts 222 is 0.030, 0.045, or 0.060 inches, which are a function of the tip dimensions such as the diameters $D_1$ and or $D_2$ as set forth above. The dimple depth may be from approximately 0.007 inches to approximately 0.030 inches. Preferably, the dimple depth is approximately 0.007, 0.015, 0.025 or 0.030 inches, which are also a function of the tip dimensions such as the diameters $D_1$ and or $D_2$ as set forth above. The Hafnium slugs, prior to being pressed into the conductive body 238, in one form are a combination of 0.045 inches and/or 0.060 inches, or in other words, different sized inserts may be used in the same electrode.

Additionally, in one form of the present disclosure, the emissive inserts are spaced relatively close to each other such that a space between their respective edges, (parallel tangent lines to each outer circumference of the emissive inserts 222), or a "web" of the electrode material between the emissive inserts is a specific distance. In one form, as shown in FIG. 13C, this spacing S is between about 0.015" and about 0.0005", and in another form is more specifically about 0.003". These spacings S are particularly advantageous when the number of emissive inserts 222 is four (4), although these spacings may also be employed with a different number of emissive inserts. It should be understood that other spacings S may be employed while remaining within the scope of the present disclosure and these values are merely exemplary.

Figure 11A:
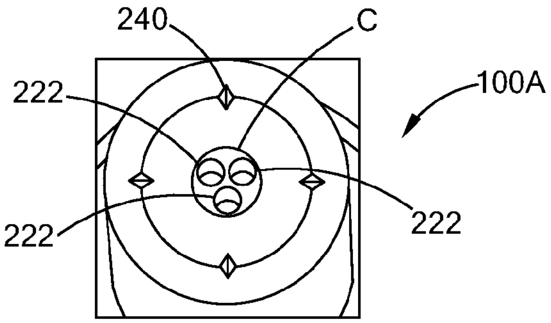
FIG. 11A through 11D are views of various forms of electrodes constructed in accordance with the principles of the present disclosure.
Figure 11B:
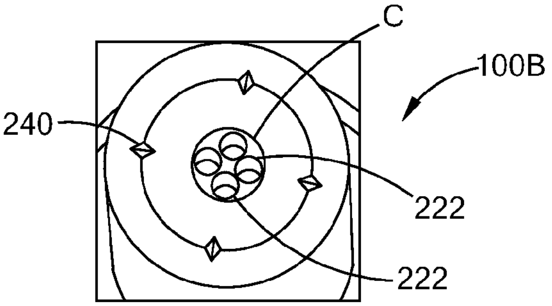
Figure 11C:
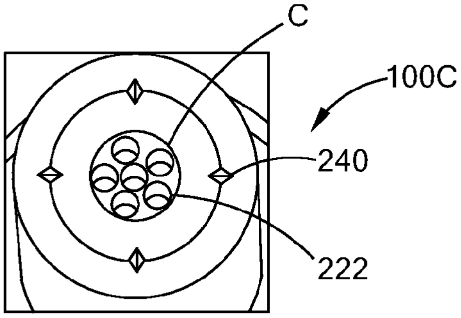
Figure 11D:
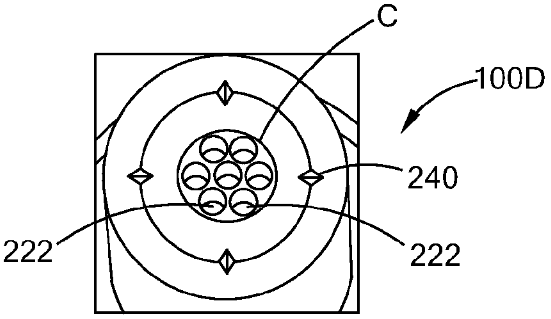
Figure 12:
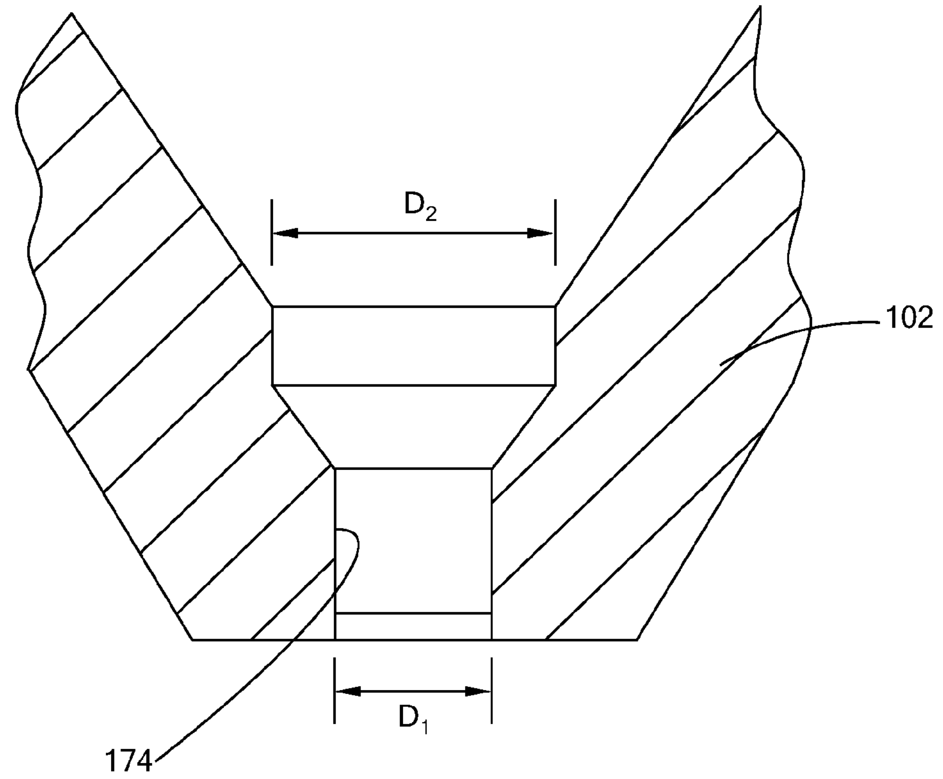
FIG. 12 is a schematic cross-sectional view of a tip showing diameters of a tip central orifice and a tip counter sink.

By way of example, and in certain forms of the present disclosure, the emissive inserts 222 of FIGS. 11A through 11D each have a diameter of 0.045 inches. In FIG. 11A, the diameter of the encircling ring C is approximately 0.100 or 0.111 inches. In FIG. 11B, the diameter of the encircling ring C is approximately 0.11 or approximately 0.121 inches. In FIGS. 11C and 11D, the diameter of the encircling ring C is approximately 0.141 inches.

Figure 13A:
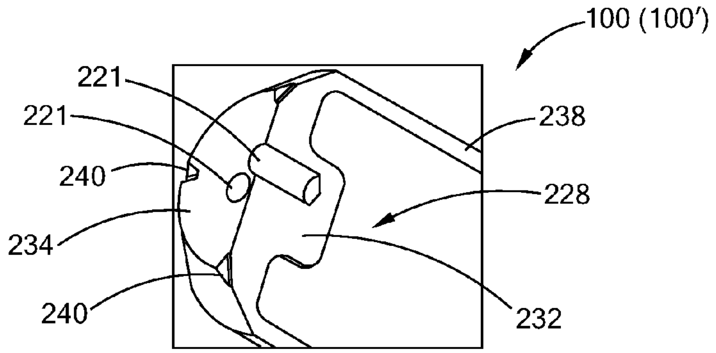
FIGS. 13A to 13D are schematic views showing steps of manufacturing an electrode constructed in accordance with the principles of the present disclosure.
Figure 13B:
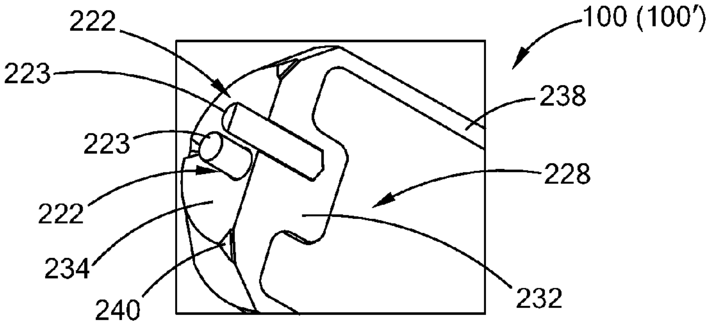
Figure 13C:
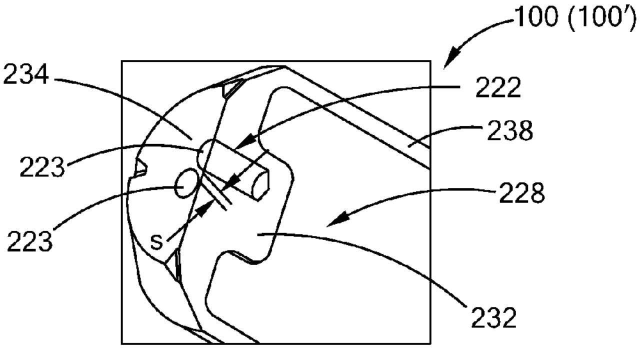
Figure 13D:
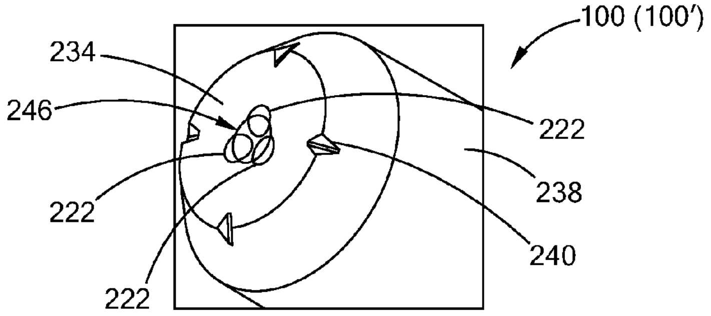

Referring to FIGS. 13A to 13D, a method of manufacturing an electrode constructed in accordance with the principles of the present disclosure is shown. First, a conductive body 238 of a cylindrical shape is prepared and machined to form a plurality of blind holes 221 and notches 240 in step (a) as shown in FIG. 13A. The electrode further includes a central protrusion 232 extending from the distal end face 234 into the central cavity 228. Next, the emissive inserts 222 are inserted into the blind holes 221 in the conductive body 238 in step (b) as shown in FIG. 13B. Thereafter, the emissive inserts 222 are pressed into the conductive body 238 until the distal faces 223 of the emissive inserts 222 are substantially flush with the distal end face 234 of the conductive body 238 in step (c) as shown in FIG. 13C. Finally, the distal end face 234 of the conductive body 238 and the distal end faces 223 of the emissive inserts 222 are machined to form a dimple 246 in step (d) as shown in FIG. 13D, thereby completing the electrode 100 or 100' of the present disclosure. Although the drawings illustrate holes for the emissive inserts, it should be understood that any shaped opening, such as conical/tapered, rectangular, or polygonal, among others, may also be employed while remaining within the scope of the present disclosure.

Figure 15:
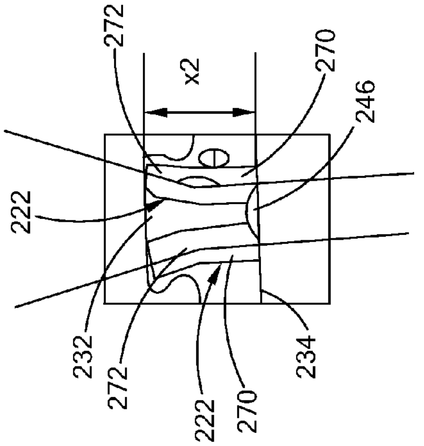
FIG. 15 is an enlarged cross-sectional view of the central protrusion of the electrode of FIG. 14 after the pressing step.
Figure 14:
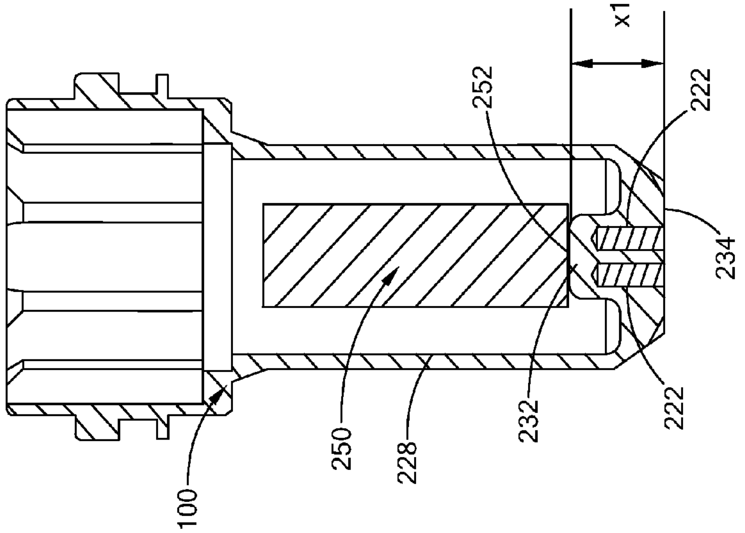
FIG. 14 is a cross-sectional view of an electrode, showing a pressing fixture for a pressing step according to a method of the present disclosure.

Referring to FIGS. 14 and 15, the pressing step (c) shown in FIG. 13C may further include a step of deforming the central protrusion 232 and the emissive inserts 222. A pressing fixture 250 may be placed in the central cavity 228 of the electrode 100 and on top of a top surface 252 of the central protrusion 232. After the emissive inserts 222 are pressed into the blind holes 221, the central protrusion 232 is pressed between the pressing fixture 250 and a supporting fixture (not shown) on the side of the distal end face 234. The pressing step causes the central protrusion 232 to deform and expand radially and outwardly. The central protrusion 232 has an original height X1 measured from the distal end face 234 to the top surface 252 prior to pressing. The height of the central protrusion 232 after pressing becomes X2. The deformation of the central protrusion 232 causes the emissive inserts 222 in the central protrusion 232 to deform. Because the central protrusion 232 is deformed to expand radially and outwardly, proximal end portions 272 of the emissive inserts 222 adjacent to the pressing fixture 250 are pressed to expand radially and outwardly, whereas distal end portions 270 of the emissive inserts 222 proximate the distal end face 234 may remain parallel to the longitudinal axis of the electrode 100 or may also expand radially and outwardly a small amount compared to the proximal end portions 272. The distal end portions 270 and the proximal end portions 272 define an angle θ, which may be obtuse. The proximal end portions 272 may be slightly curved relative to the distal end portions 270. The changed shape of the emissive inserts 222 results in increased contact pressure between the emissive inserts 222 and the central protrusion 232, resulting in improved thermal contact conductance between hafnium (which forms the emissive inserts 222 in one form of the present disclosure) and copper (which forms the central protrusion 232 in one form of the present disclosure).

As a result, the deformed emissive inserts 222 increase the life the electrode 100. It should also be understood that the teachings herein of deformed emissive inserts may also be applied to a single emissive insert rather than a plurality of emissive inserts while remaining within the scope of the present disclosure.

The ratio (X2/X1) of the height of the central protrusion 232 after pressing to the original height of the central protrusion 232 prior to pressing (hereinafter "height ratio") may be in the range of approximately 0.75 to approximately 1, an in another form is in the range of approximately 0.9 to approximately 0.95.

Similarly, a dimple 246 may be formed at the center of the distal end face 234 to improve consumable life of the electrode 100.

Figure 16:
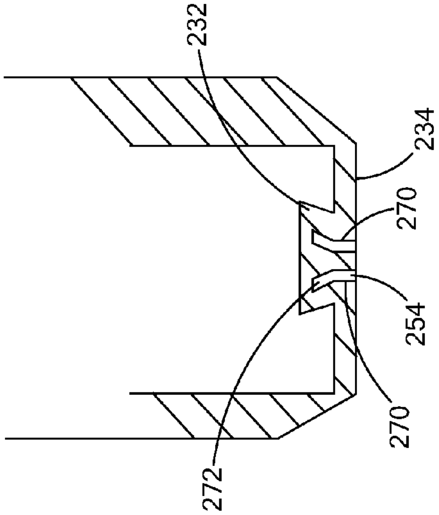
FIG. 16 is an enlarged schematic view of a central protrusion of an electrode showing angled blind holes according to another method of the present disclosure.

Referring to FIG. 16, a method of manufacturing the electrode according to another embodiment of the present disclosure is similar to that described in connection with FIGS. 13A to 13D except for the step of forming the blind holes. In the present embodiment, the central protrusion 232 is drilled to form angled blind holes (or openings) 254 that may a desired final shape of the emissive inserts 222. The emissive inserts 222 are pressed into the angled blind holes 254. The emissive inserts 222 are firmly secured to the central protrusion 232 due to deformation of the emissive inserts 222 in the angled blind holes 254. As a result, the emissive inserts 222 may be deformed during pressing to form the desired final shape with the desired shape and angle θ. The emissive inserts 222 pressed into the central protrusion 232 each include a distal end portion 270 proximate the distal end face 234 and a proximal end portion 272 proximate the top surface 252 of the central protrusion 232. The distal end portion 270 may be parallel to the longitudinal axis of the electrode 100 or slightly angled relative to the longitudinal axis of the electrode 100, whereas the proximal end portion 272 extends radially and outwardly from the distal end portion 272 to define an angle θ relative to the distal end portion 270. (i.e., the emissive inserts 222 are deformed during pressing). The angle θ may be an obtuse angle. The central protrusion 232 may or may not be deformed in this embodiment. Additionally, it should be understood that the blind holes/openings 254 may alternatively be parallel to a longitudinal axis of the electrode, or the angle may be outwardly as shown, or alternatively, angled inwardly towards a centerline of electrode. In other forms, the inserts may be formed at different angles to themselves, i.e., one angled inwardly, one angled outwardly, one parallel, etc. Accordingly, the form illustrated and described herein of angled outwardly for the obtuse angle of all inserts (or a single insert) should not be construed as limiting the scope of the present disclosure. Additionally, it should be understood that the "angle" is a relative angle and that the emissive inserts 222 may not necessarily take on a linear deformation to form a precise angle, or in other words, the emissive inserts 222 may be curved or arcuate as shown in the picture of FIG. 15.

Figure 17B:
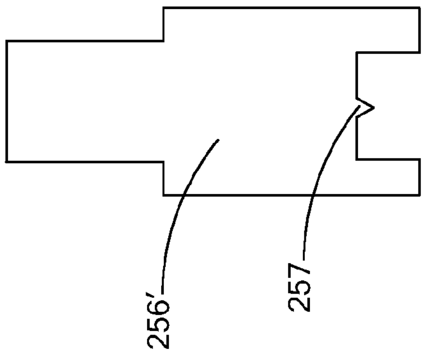
FIG. 17B is another form of the pressing fixture constructed in accordance with the teachings of the present disclosure.
Figure 17A:
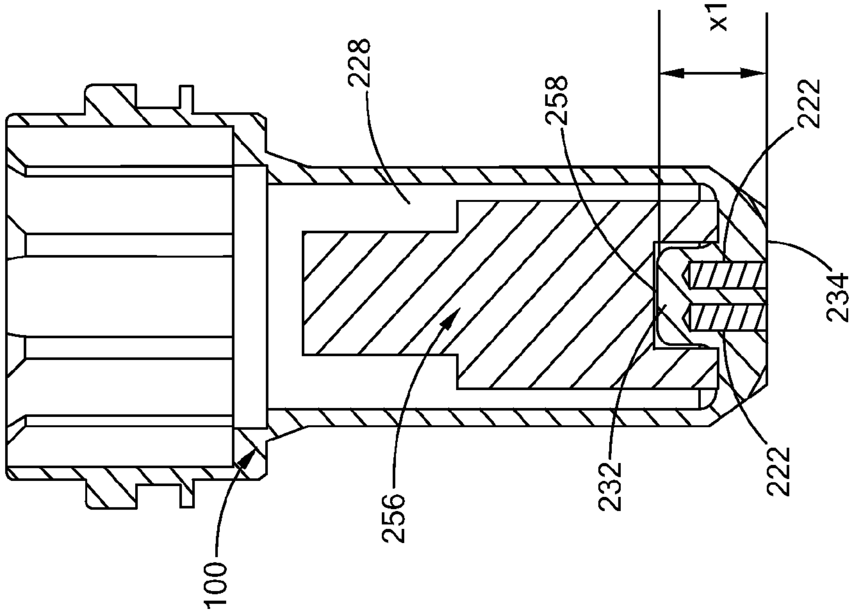
FIG. 17A is a cross-sectional view of an electrode, showing a pressing fixture for a pressing step according to still another method of the present disclosure.

Referring to FIG. 17A, a method of manufacturing the electrode according to still another embodiment of the present disclosure is similar to that described in connection with FIG. 14 except for the configuration of the pressing fixture. In the present embodiment, the pressing fixture 256 defines an open chamber 258 for receiving the central protrusion 232 therein. The open chamber 258 may be slightly larger than the central protrusion 232 and has a desired final shape of the central protrusion 232. Therefore, the central protrusion 232 is deformed to form a shape that is same as the shape of the open chamber 258, while deforming the emissive inserts 222 as well. The open chamber 258 may define a hemispherical shape or a rectangular shape, or any other suitable shape.

Referring to FIG. 17B, another form of a pressing fixture is illustrated as reference numeral 256'. This pressing fixture 256' includes a protrusion 257, which in this form is a triangular geometry as shown, in order to control the deformation of the emissive inserts 222 during the pressing operation. It should be understood that other geometries may also be employed to control the deformation, such as a dimple (rounded) or a square or other polygonal shape while remaining within the scope of the present disclosure. Additionally, the pressing fixture 256' may have the open chamber 258, or may be flat across the pressing area (as shown in FIG. 14).

Similar to the embodiment in FIG. 14, the ratio (X2/X1) of the deformed height (X2) to the original height (X1) may be in the range of approximately 0.75 to approximately 1, and preferably in the range of approximately 0.9 to approximately 0.95.

Figure 18:
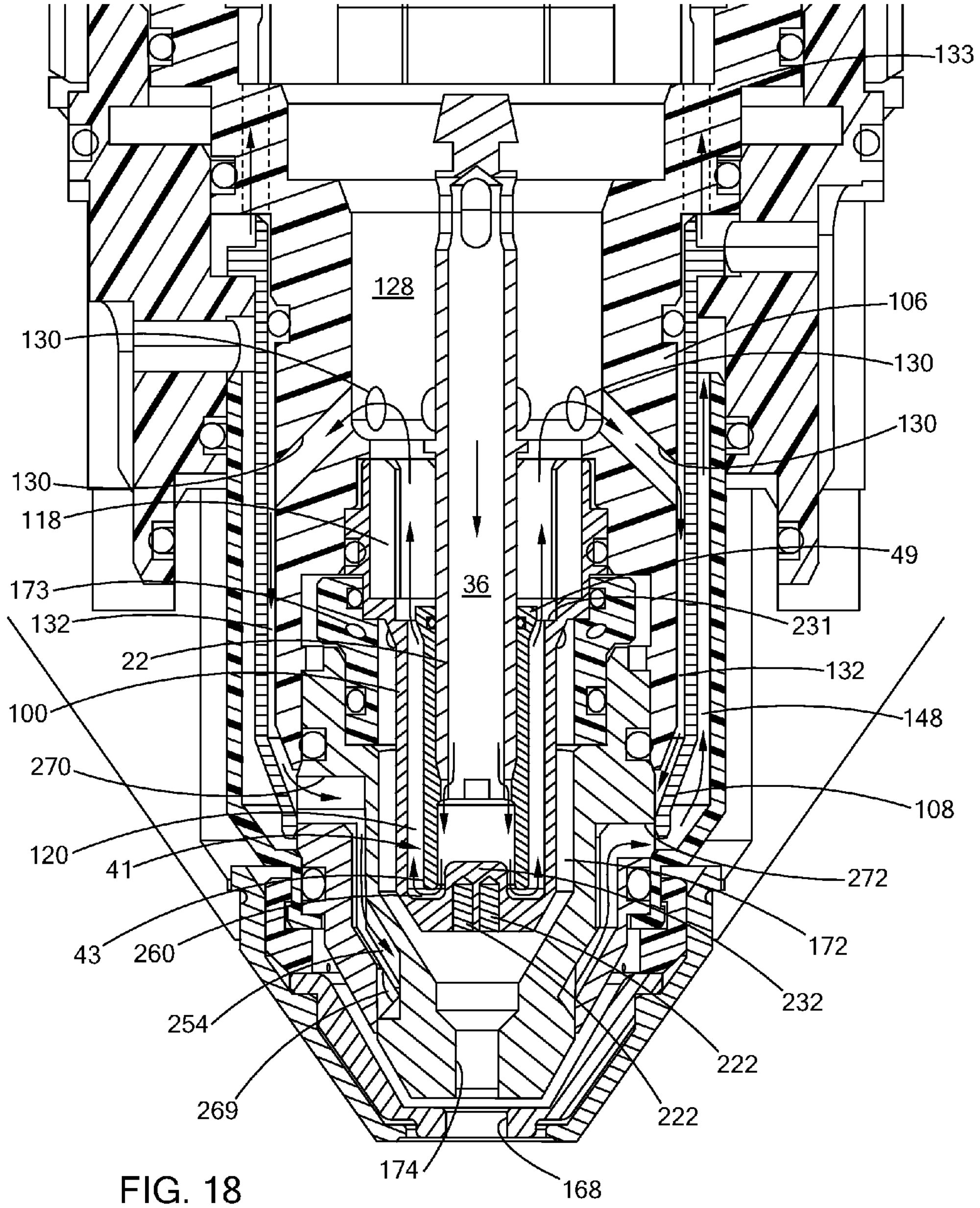
FIG. 18 is an enlarged cross-sectional view of the consumable cartridge showing the direction of the cooling fluid flow.

Referring to FIG. 18, the life of the electrode 100 is significantly improved not only through the unique structure of the electrode 100, but also through the arrangement of the electrode 100 in the plasma arc torch 10. As shown, when assembled, the central protrusion 232 of the electrode 100 is disposed inside the central bore 46 of the coolant tube assembly 41 with a cooling channel 258 defined between the recessed portion 253 of the electrode 100 and the distal end 43 of the coolant tube assembly 41. In operation, the cooling fluid flows distally through the central bore 36 of the cathode 22, through the coolant tube assembly 41, through the cooling channel 258 and into the distal cavity 120 of the electrode 100 and between the coolant tube assembly 41 and the cylindrical body 238 of the electrode 100. The cooling fluid then flows proximally through the proximal cavity 118 of the electrode 100 to provide cooling to the electrode 100 and the cathode 22 that are operated at relatively high currents and temperatures.

Advantageously, the coolant tube assembly 41 (which is spring-loaded) is forced upwardly by the electrode 100 near its proximal end portion 224, and more specifically, by the interior face 231 of the electrode 100 abutting the tubular member 43 at its proximal flange 49. With this configuration, the distal end 43 of the coolant tube assembly 41 is not in contact with the electrode 100 and thus more uniform cooling flow is provided around the emissive inserts 222 and the central protrusion 232, thereby further increasing the life of the electrode 100. Referring to FIG. 9, the external shoulder 230 in an alternate form is squared off with the cylindrical sidewall 238, rather than being tapered as shown in this figure.

Figure 19:
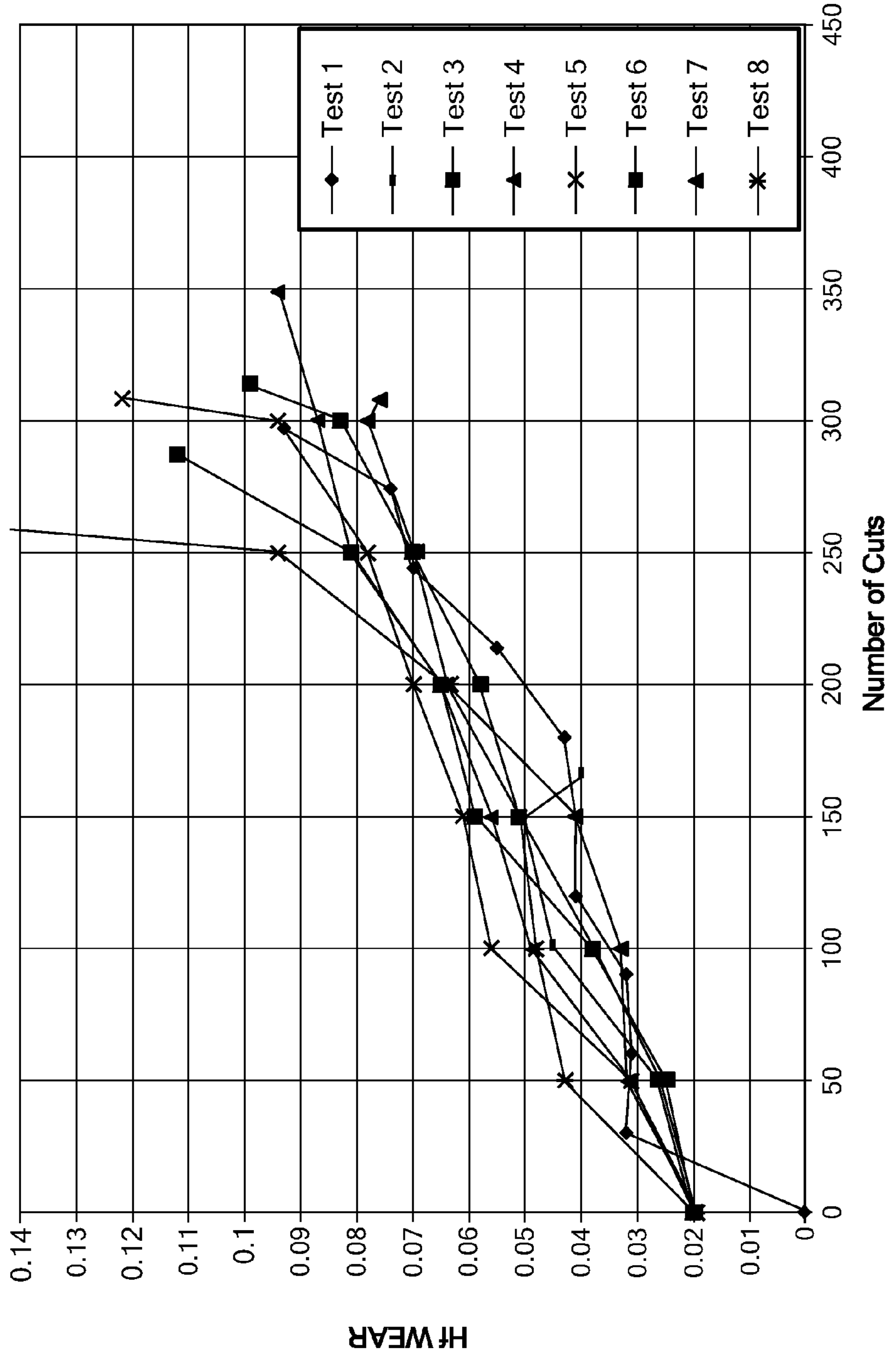
FIG. 19 is a graph showing life of prior art electrodes with a single Hafnium insert, wherein the life is measured by number of cuts performed.
Figure 20:
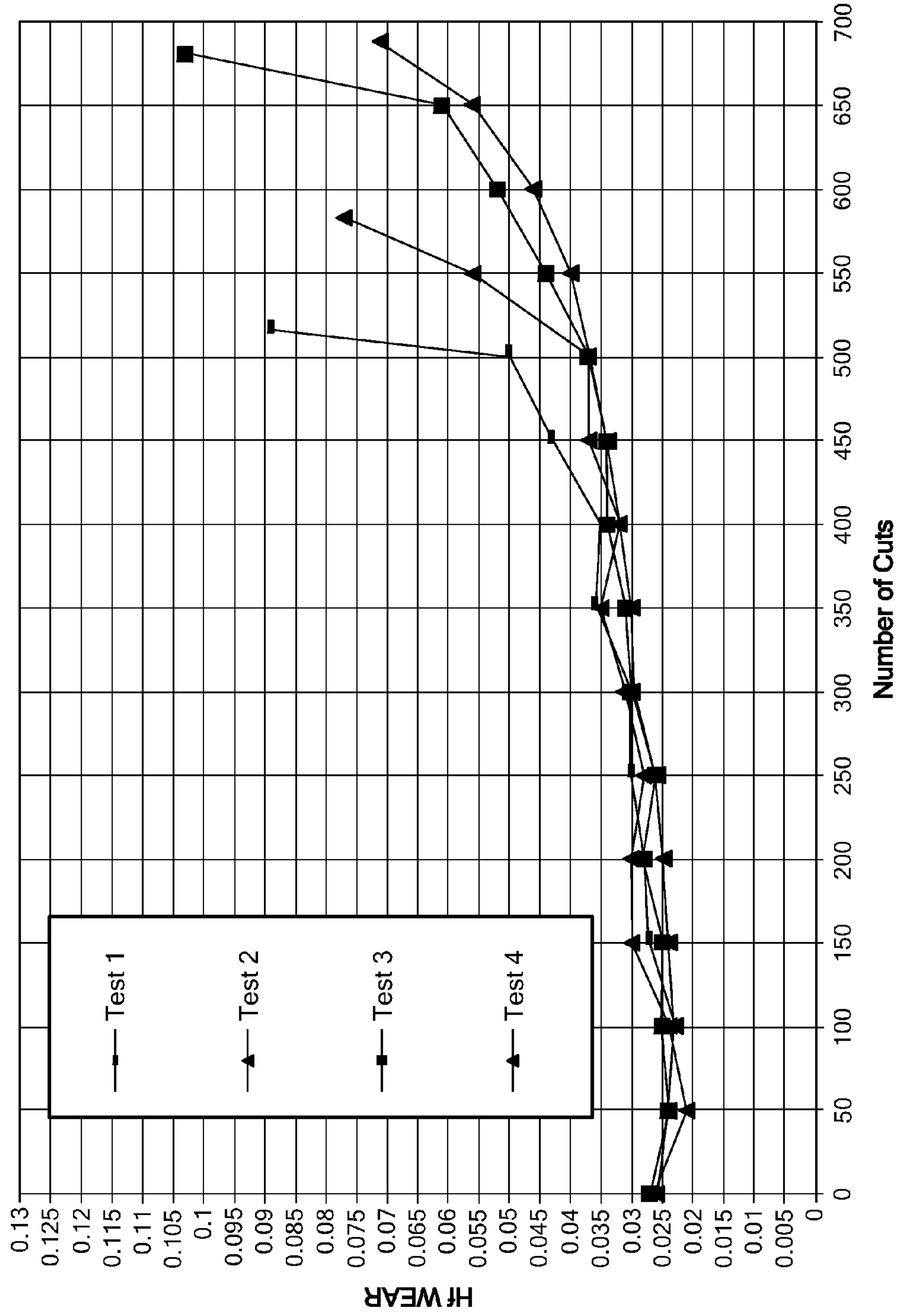
FIG. 20 is a graph showing life of electrodes having three Hafnium inserts and constructed in accordance with the principles of the present disclosure, wherein the life is measured by number of cuts performed.

Referring to FIGS. 19 and 20, the graphs show life of prior art electrodes and life of electrodes in accordance with the principles of the present disclosure with respect to number of cuts performed, respectively. As shown in FIG. 19, a prior art electrode having a single hafnium insert significantly wears after the electrode has performed approximately 250-350 cuts. In contrast, an electrode 100 or 100' of the present disclosure significantly wears after the electrode 100 or 100' has performed approximately 500-650 cuts as shown in FIG. 20. Therefore, the life of the electrode 100 may be increased by at least 70% from conventional designs. The Hafnium emissive inserts 222 are inserted, for example by pressing, into the oxygen-free distal end portion 226 of the conductive body 220. This allows the heat input from the arc to be distributed on the plurality of emissive inserts 222. Each individual insert 222 is in contact with the conductive body 220 resulting in significant increase in the heat dissipation from the Hafnium emissive inserts 222. Additional cooling of the emissive inserts 222 decreases Hafnium wear. As an example, when three emissive inserts 222 are used, the emissive inserts 222 may have a diameter of 0.045 inches as opposed to a traditional electrode having a single emissive insert of 0.092 inches in diameter.

Figure 21:
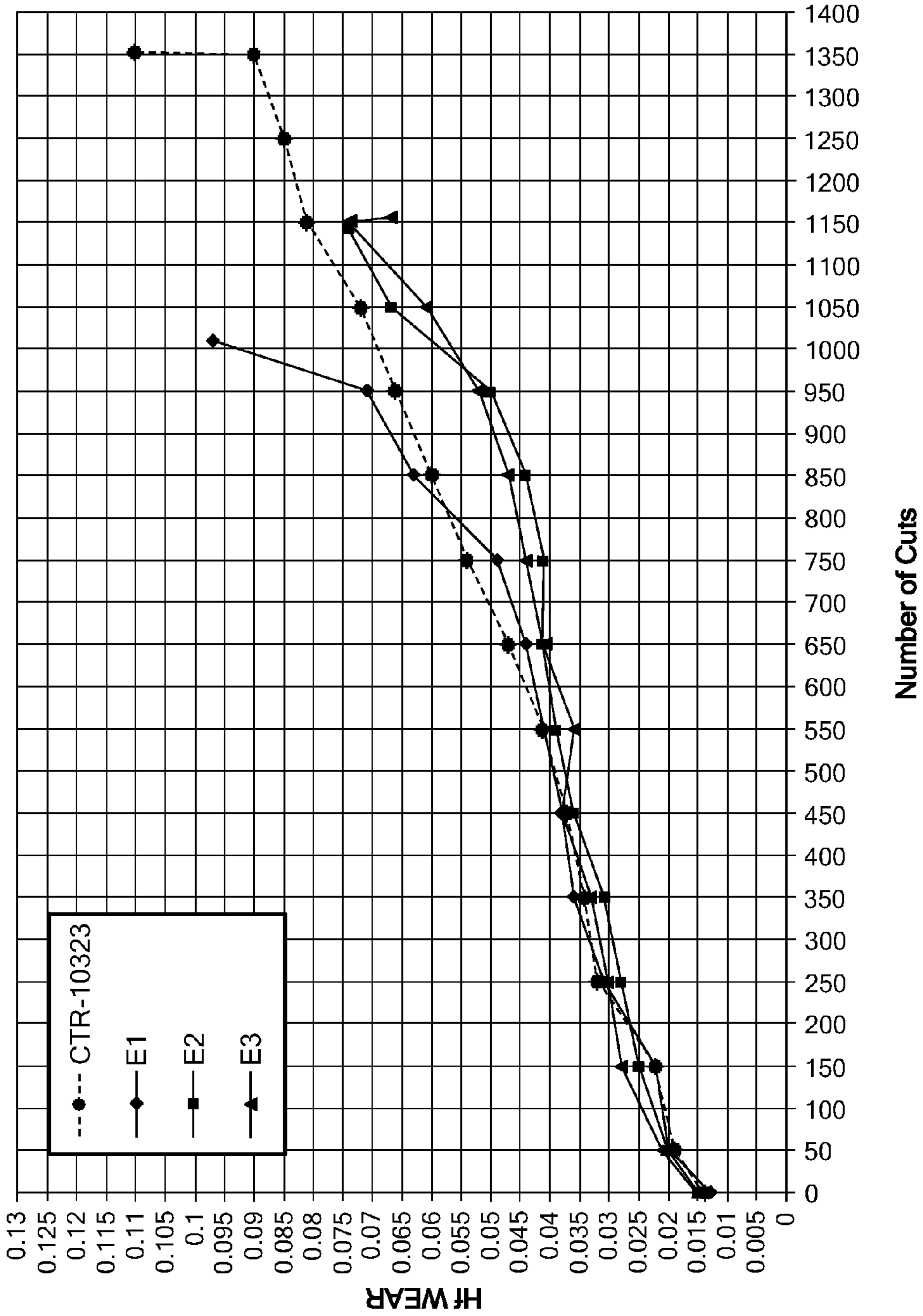
FIG. 21 is a graph showing life of electrodes having four Hafnium inserts with deformed central protrusions and deformed emissive inserts constructed in accordance with the principles of the present disclosure, wherein the life is measured by number of cuts performed.

Referring to FIG. 21, the life of an electrode in accordance with the present disclosure is further increased when four emissive inserts are used. The electrode with four emissive inserts significantly wears after the electrode has performed approximately 950-1000 cuts.

Figure 22:
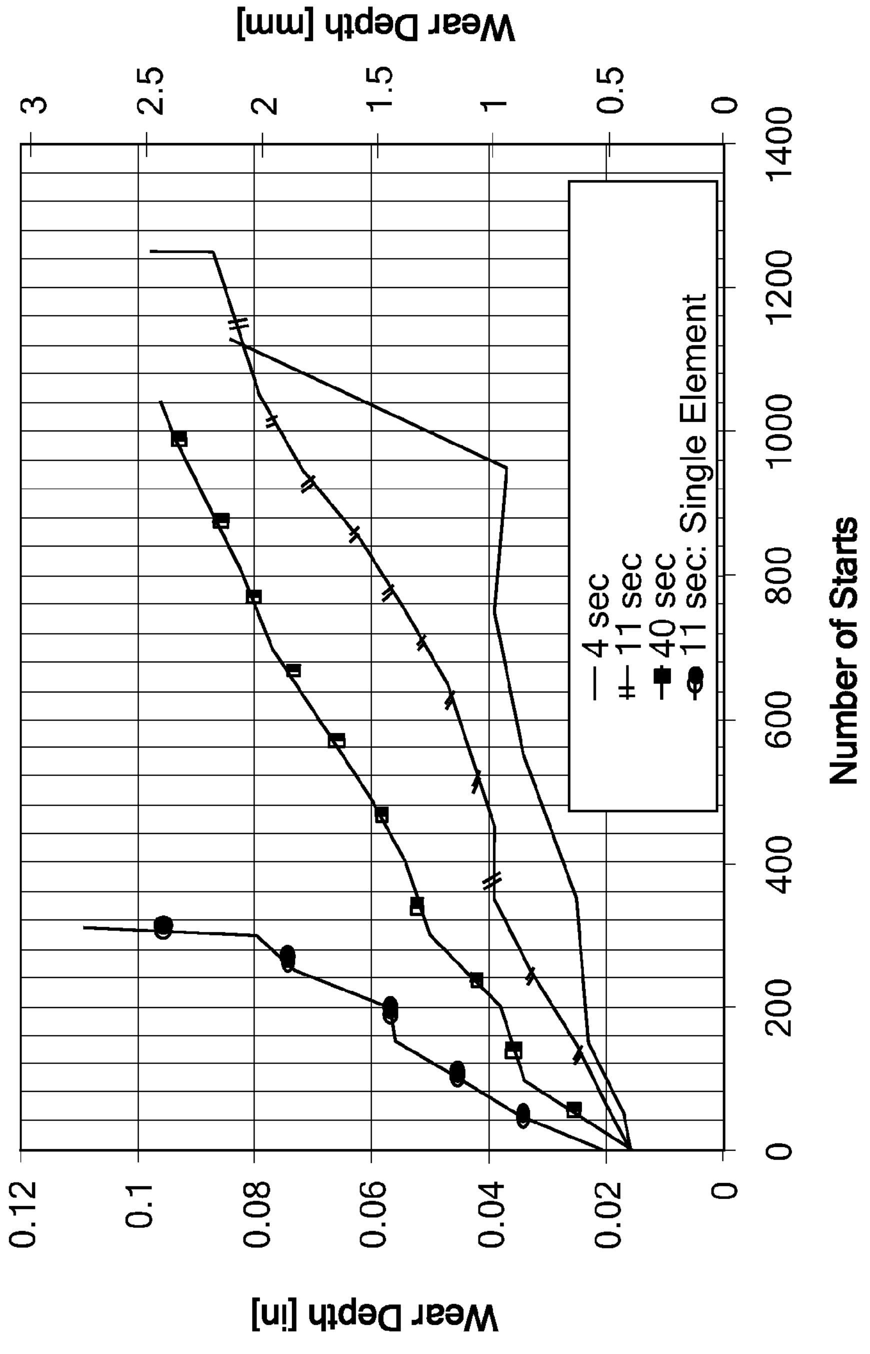
FIG. 22 shows graphs of wear depth versus number of starts for electrodes that have a single emissive insert and multiple emissive inserts, respectively, at different operating cycles.

Referring to FIG. 22, the wear of electrodes having a single emissive insert and multiple emissive inserts is compared under different operating cycles. Under the same operating cycle of 11 seconds, an electrode having a single emissive insert significantly wears at approximately 300 starts, whereas an electrode having multiple emissive inserts has the same wear depth at approximately over 1100 starts. When the electrodes with multiple emissive inserts are operated under an operating cycle of less than 11 seconds, for example, 4 seconds, the wear depth is reduced for the same number of starts.

Figure 23:
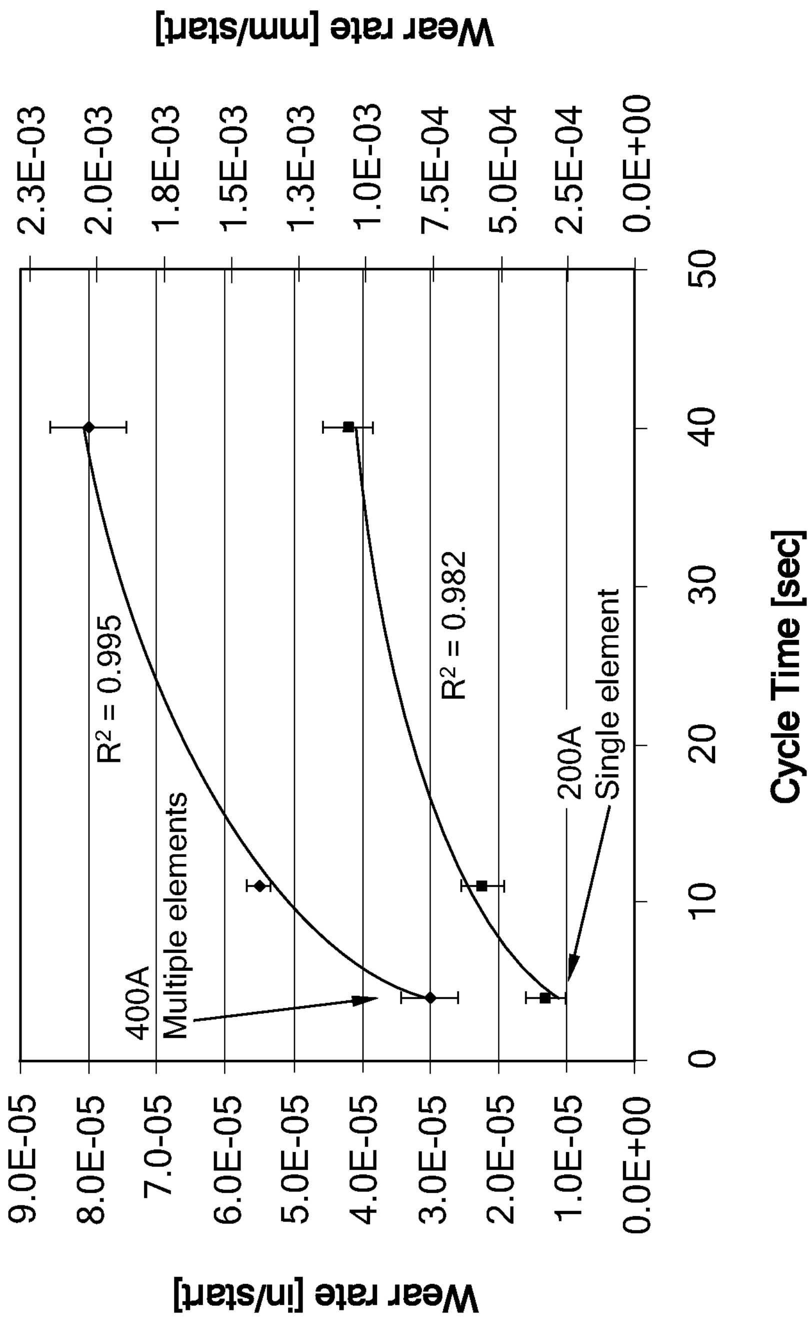
FIG. 23 shows graphs of wear rate versus operating cycles of for electrodes that have a single emissive insert and multiple emissive inserts, respectively.

Referring to FIG. 23, the wear rate of the electrode versus operating cycle time for electrodes having a single emissive insert and multiple emissive inserts, at both 200 A and 400 A, is shown. Additionally, the value $R^2$ is a correlation coefficient representing the quality of the fit between the insert and the electrode (the closer to 1 the better).

Figure 24:
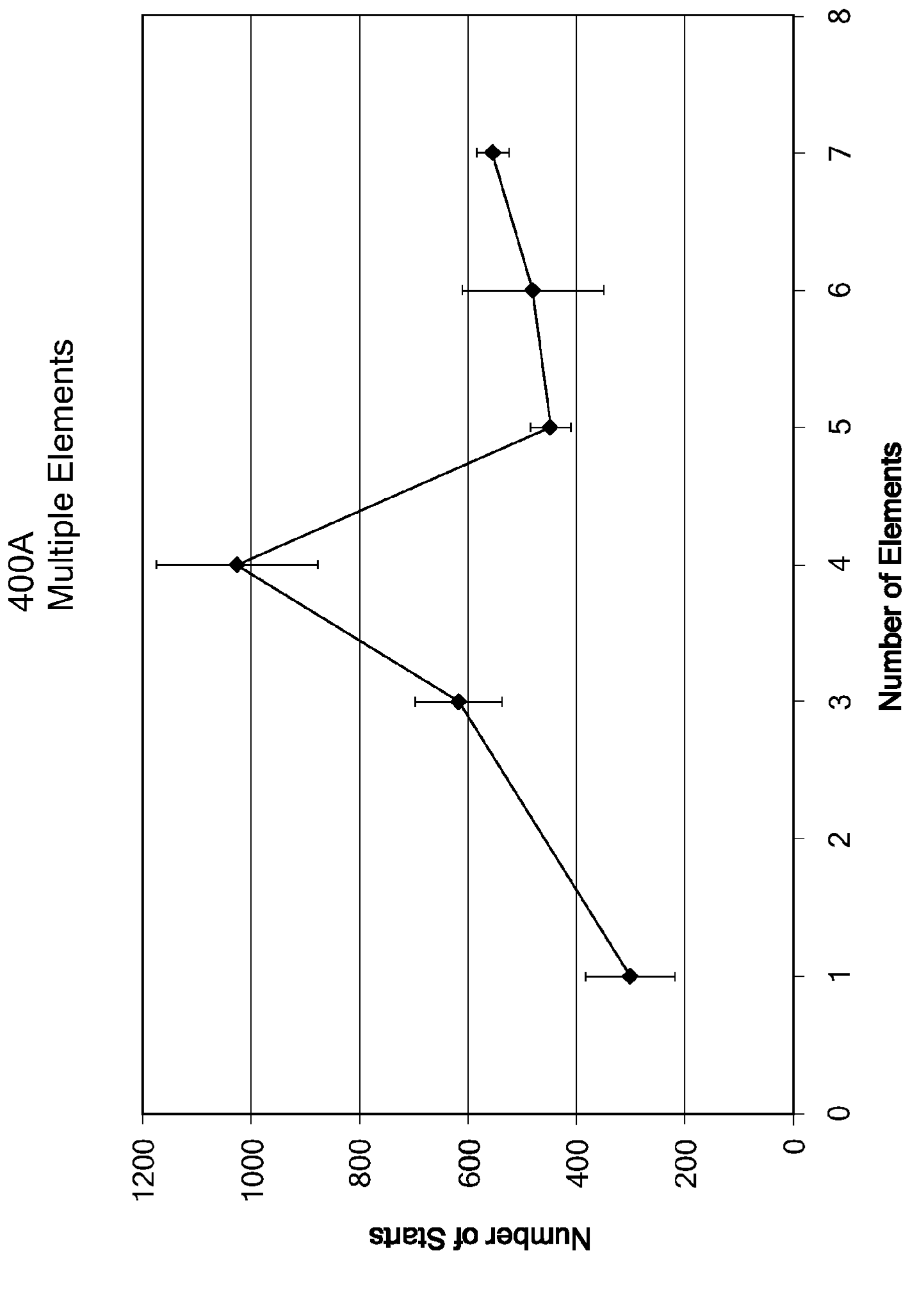
FIG. 24 shows graphs of life of electrodes measured by number of starts as a function of number of hafnium emissive inserts in the electrodes.

Referring to FIG. 24, life of electrodes measured by number of starts for electrodes having different numbers of emissive inserts is shown. The X coordinate indicates the number of emissive inserts in an electrode, whereas the Y coordinate indicates the life of the electrodes measured by the number of starts. As shown, an electrode having four emissive inserts has the longest life of approximately 1000 starts under 400 A operating condition, as opposed to an electrode having only one emissive insert and having a life of approximately 300 starts. An electrode having three emissive inserts has the second longest life of approximately 600 starts. The life of electrodes having 5, 6 and 7 emissive inserts is not significantly different.

Figure 25:
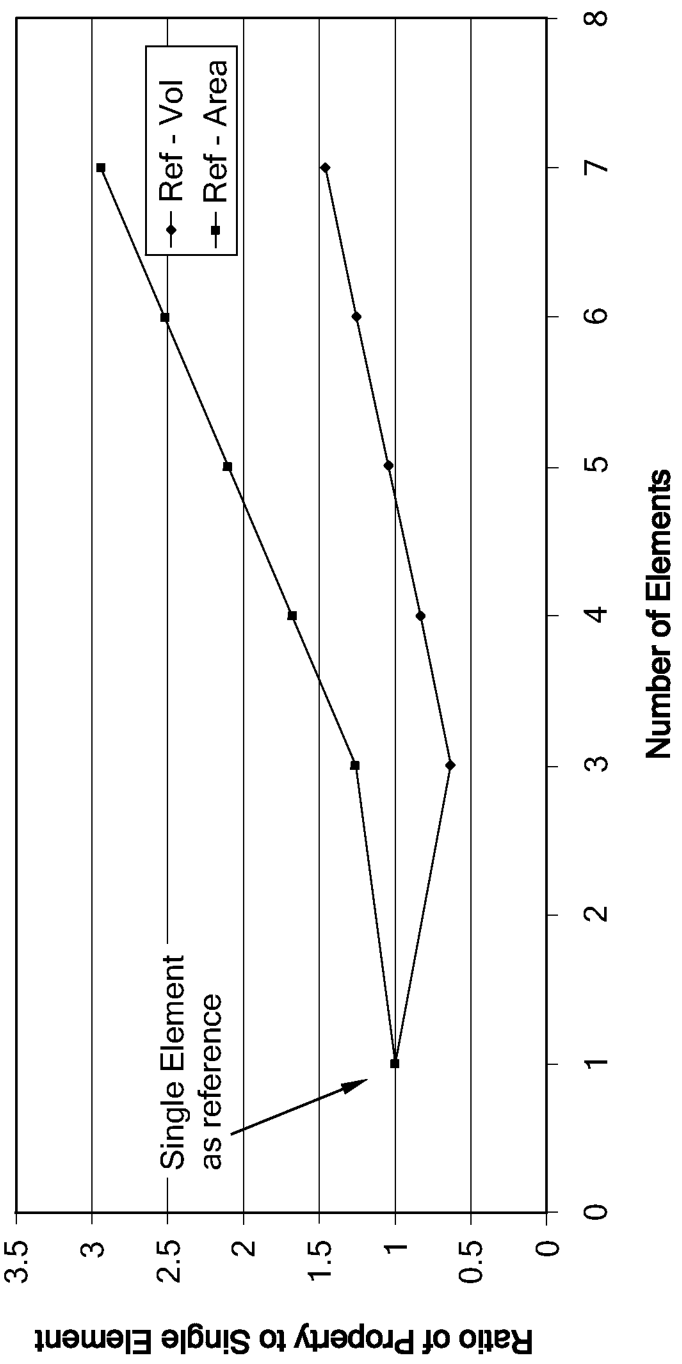
FIG. 25 shows graphs of ratio property to single element versus number of emissive elements in the electrodes.

Referring to FIG. 25, ratio properties of multiple inserts versus a single insert are shown. Two ratios are illustrated, volume and external surface area. "Ref-Vol" is the ratio of the total volume of multiple inserts to the total volume of a single insert. "Ref-Area" is the ratio of the total area of multiple inserts to the total surface area of a single insert. Using more inserts provides more surface area, and thus more total surface area for cooling.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electrode for use in a plasma arc torch, comprising:

a conductive body including a proximal end portion, a distal end portion and a cavity extending from the proximal end portion to the distal end portion, the distal end portion defining a distal end face; and a plurality of emissive inserts extending through the distal end face, wherein the conductive body defines a dimple extending into the distal end face and at least partially into the emissive inserts, the dimple positioned concentrically about a centerline of the conductive body.

2. The electrode according to claim 1, wherein the dimple is disposed at a center of the distal end face.

3. The electrode according to claim 1, wherein the dimple extends into approximately 50% of an exposed area of the emissive inserts.

4. The electrode according to claim 1, further comprising:

an angled sidewall extending from the distal end face to a cylindrical sidewall of the conductive body; and a plurality of notches extending into the distal end face and the angled sidewall.

5. The electrode according to claim 4, wherein the notches are evenly spaced around an interface between the distal end face and the angled sidewall.

6. The electrode according to claim 1, further comprising a central protrusion disposed within the central cavity and at the distal end portion of the conductive body, wherein the plurality of emissive inserts extend into the central protrusion and not into the central cavity.

7. The electrode according to claim 5, wherein the central protrusion defines a height ratio of approximately 0.75 to approximately 1.

8. The electrode according to claim 7, wherein the height ratio is approximately 0.9 to approximately 0.95.

9. The electrode according to claim 1, wherein the emissive inserts comprise a Hafnium alloy.

10. The electrode according to claim 1, wherein the emissive inserts define a cylindrical configuration having a diameter of approximately 0.045".

11. The electrode according to claim 1, wherein a spacing between the emissive inserts is between about 0.015" and about 0.0005".

12. The electrode according to claim 11, wherein the spacing is about 0.003".

13. The electrode according to claim 1, further comprising four emissive inserts.

14. The electrode according to claim 1, wherein the plurality of emissive inserts each extend radially and outwardly from the distal end portion at an angle relative to the distal end portion.

15. The electrode according to claim 14, wherein the plurality of emissive inserts each include a distal end portion and a proximal end portion defining an obtuse angle therebetween.

16. The electrode according to claim 1, wherein the emissive inserts are encircled by an encircling ring C, and the encircling ring C is a function of a diameter $D_1$ of a central orifice of a tip or a diameter $D_2$ of a tip counter-sink.

17. The electrode according to claim 16, wherein all of the emissive inserts are encircled in the encircling ring C.

18. The electrode according to claim 16, wherein the encircling ring C is tangent to the plurality of emissive inserts.

19. An electrode for use in a plasma arc torch, comprising:

a conductive body including a proximal end portion, a distal end portion and a cavity extending from the proximal end portion to the distal end portion, the distal end portion defining a distal end face; and a plurality of emissive inserts extending through the distal end face, wherein the conductive body defines a dimple at a center of the distal end face and extending into the distal end face and only partially into the emissive inserts.

20. An electrode for use in a plasma arc torch, comprising:

a conductive body including a proximal end portion, a distal end portion and a cavity extending from the proximal end portion to the distal end portion, the distal end portion defining a distal end face;

a central protrusion extending from the distal end face into the cavity; and a plurality of emissive inserts extending through the distal end face, wherein the conductive body defines a dimple at a center of the distal end face and recessed from the distal end face, the plurality of emissive inserts arranged along an outer periphery of the dimple and overlapping the dimple.

* * * * *